United States Patent
Haase et al.

(10) Patent No.: US 6,826,117 B2
(45) Date of Patent: Nov. 30, 2004

(54) TRACKING, SAFETY AND NAVIGATION SYSTEM FOR FIREFIGHTERS

(75) Inventors: Wayne C. Haase, Sterling, MA (US); Zachary S. Haase, Sterling, MA (US); Paul M. Chizinski, New Ipswich, NH (US); Malcolm S. MacGregor, Acton, MA (US); Donald B. Bruck, Bedford, MA (US)

(73) Assignee: Summit Safety, Inc., Devens, MA (US)

( * ) Notice: Subject to any disclaimer, the term of this patent is extended or adjusted under 35 U.S.C. 154(b) by 0 days.

(21) Appl. No.: 10/327,718

(22) Filed: Dec. 20, 2002

(65) Prior Publication Data

US 2003/0156495 A1 Aug. 21, 2003

Related U.S. Application Data

(63) Continuation-in-part of application No. 09/814,175, filed on Mar. 21, 2001, now Pat. No. 6,504,794
(60) Provisional application No. 60/342,589, filed on Mar. 22, 2000.

(51) Int. Cl.[7] ................................................. G01S 3/80
(52) U.S. Cl. ....................................................... 367/119
(58) Field of Search ................................. 367/118, 119, 367/120, 121, 910

(56) References Cited

U.S. PATENT DOCUMENTS

| 4,604,733 A | | 8/1986 | Brown et al. ................. 367/2 |
| 5,491,670 A | * | 2/1996 | Weber ....................... 367/127 |
| 6,504,794 B2 | * | 1/2003 | Haase et al. ................ 367/119 |

FOREIGN PATENT DOCUMENTS

| WO | WO9933189 | * | 7/1999 | ............ H04B/1/02 |

* cited by examiner

*Primary Examiner*—Daniel T. Pihulic
(74) *Attorney, Agent, or Firm*—Weingarten, Schurgin, Gagnebin & Lebovici LLP

(57) ABSTRACT

An ultrasonic signal is used to link a beacon unit to a tracker unit to provide a tracking and navigation system for firefighters to use in a smoke filled environment at the scene of a fire. The beacon unit transmits an omnidirectional ultrasonic signal. The tracker unit, using a directional ultrasonic receiver provides a display or other indication of the signal strength of the received ultrasonic signal to allow the direction to the beacon unit to be determined. The ultrasonic signal provided by the beacon unit may be pulse modulated to include digitally encoded data that may be used to identify particular individuals, objects, materials, dangers, or exits. In addition, the tracker unit may be provided with a transmitter and the beacon unit provided with a receiver such that audio communication may be established therebetween.

50 Claims, 12 Drawing Sheets

Mechanical Scan of Room

TRACKING, SAFETY AND NAVIGATION SYSTEM FOR FIREFIGHTERS

CROSS REFERENCE TO RELATED APPLICATIONS

This application is a continuation in part of patent application Ser. No. 09/814,175 filed Mar. 21, 2001 that has issued as U.S. Pat. No. 6,504,794 and claims priority to Provisional Application No. 60/342,589 filed Mar. 22, 2000 and titled FIREFIGHTER TRACKER SAFETY AND NAVIGATIONAL SYSTEM

STATEMENT REGARDING FEDERALLY SPONSORED RESEARCH OR DEVELOPMENT

N/A

BACKGROUND OF THE INVENTION

Firefighting is a dangerous and difficult job performed in a hostile and dangerous environment. During a fire the air inside a burning structure can rapidly fill with dense smoke that can reduce visibility to only a few inches. The temperature within the structure can range from 200° (F.) to 400° (F.) near the floor and often be between 1000° (F.) to 2000° (F.) near the ceiling. Flash over, which is when the entire environment within the structure may reach 1000° (F.) to 2000° (F.), can cause incineration of virtually all combustible material. A firefighter who has become separated or disabled needs to be located very quickly to prevent an injury from occurring or to rescue the firefighter after an injury has occurred. If the location of the firefighter is not known an area search must be performed. The difficulty of performing an area search is compounded by the firefighters own equipment, which typically includes a helmet, air supply, coat, trousers, boots, and gloves that are designed to protect the firefighter from the surrounding hostile environment. This equipment which may weigh in the range of 50–70 lbs, makes movement difficult and restricts visibility even more. In addition, the scattering of light due to the smoke particles can severely restrict the effectiveness of flash lights.

Passive infrared imaging systems have been used to aid in location of firefighters lost or injured within a burning structure. However, these systems which distinguish objects based on the temperature difference between the object and its environment are better equipped to locate the fire itself. In addition, the system may be unable to distinguish a body from a group of burning embers in the shape of a person. Additionally, infrared light is scattered by smoke particles resulting in an image that is attenuated and blurred. Another problem for passive infrared systems is the rapidly changing temperature within the structure. As the temperature within the structure rises the victims temperature becomes lower than the surrounding area and becomes difficult to detect as the system may be saturated by the intense heat of the fire. Finally, the firefighters protective equipment is designed to minimize heat flow from the firefighter, thus making the temperature on the surface of the equipment very close to that of the environment making a fully outfitted firefighter invisible to the system.

As noted above, Rayleigh scattering scatters a wave, such as light or sound, that is passing through a medium that includes particulate matter that has a dimension that is small when compared to the wavelength of the wave. Smoke particles will scatter light, which is known as Rayleigh scattering, reducing the effective visibility within the smoke filled environment to a few feet at best. Rayleigh scattering of a wave is inversely proportional to the fourth power of the wavelength of the wave passing through the medium. Visible light has a wavelength of approximately 400–700 nanometers(nm) and will undergo greater Rayleigh scattering than infrared light having a wavelength greater than 700 nm.

Radio frequency systems using triangulation or the global positioning system (GPS) have been proposed for locating firefighters as well. In order to design a highly directional system with sufficient accuracy to locate a person within a structure, frequencies having wavelengths on the order of one inch or less would be preferred. This translates to frequencies in the range of 10 GHz or higher. However, interference caused by the materials that are contained within the buildings and that the buildings are fabricated from will be severely reflected and attenuated by the structure rendering them unsuitable for use in locating firefighters within a burning structure.

Therefore, it would be advantageous for a tracking and navigation system to be able to operate within the hostile environment of a burning structure without being affected by the smoke, heat, and the structure itself.

BRIEF SUMMARY OF THE INVENTION

An apparatus and method is disclosed for locating individuals, such as firefighters, and navigating in a smoke filled environment using a beacon unit transmitting an omnidirectional ultrasonic signal that is received by a tracker unit. The tracker unit includes a directional ultrasonic transducer coupled to an ultrasonic receiver. The ultrasonic receiver provides an indicia of the signal strength of the received ultrasonic signal, thus indicating the approximate azimuth angle to the beacon unit from the tracker. The indicia can include visual indicia such as varying the intensity or pulse rate of a single light source, or providing a linear array of lights wherein the number of light sources illuminated is indicative of the received signal strength. Alternatively, an audio signal such as varying the pitch of an audio signal or varying a pulse rate of an audio signal may be used to indicate the received signal strength. The ultrasonic signal may be modulated to include encoded digital data that may be used to identify individuals, objects, dangerous conditions, or exits.

In another embodiment, the beacon unit and tracker unit can both include an ultrasonic transmitter and receiver coupled to an ultrasonic transducer. The beacon unit provides an omnidirectional ultrasonic signal and the tracker unit includes a directional receiver that provides an output indicia of the signal strength of the received ultrasonic signal. The tracker unit sends an interrogation pulse to the beacon unit that responds with an answer pulse. To avoid self-interference, the interrogation pulse and the answer pulse may be different frequencies, different pulse widths, or both. The tracker unit and beacon unit can be configured and arranged to determine the range between the tracker unit. In this embodiment, both the azimuth angle and the distance to the beacon unit from the tracker unit may be determined. The beacon unit can be configured and arranged to provide a modulated ultrasonic signal that can include encoded digital data that is received by the tracker unit and decoded to identify individuals, objects, dangerous situations, and exits. Additionally, voice modulation may be added to the transmitters of both the beacon unit and the tracker unit to provide voice communication therebetween.

In another embodiment, a plurality of directional ultrasonic transducers and corresponding ultrasonic receivers can be arranged in a one-dimensional linear array. The received signal strength from each receiver is analyzed and displayed on a linear array of light sources that indicate the azimuth angle between the beacon unit and the tracker unit. The plurality of directional ultrasonic transducers can also be arranged in a two-dimensional array, and the resulting received signal strengths analyzed to determine both the azimuth and the elevation between the beacon unit and the tracker unit.

Another embodiment includes a method to convert non-directional ultrasonic transducers into directional ultrasonic transducers by use of an acoustic horn to take advantage of commercially available devices.

Another embodiment includes a method to generate a narrow-band filter whose frequency is tunable and crystal controlled to allow the Tracker to be rapidly switched from one ultrasonic frequency to another. The bandwidth of this filter can be adjusted to be sufficiently narrow to reject interfering signals commonly found in fire scenes.

Another embodiment of this invention includes an algorithm to simplify calculation of square root of sum of squares of signal magnitudes.

Another embodiment of this invention includes a method to reduce the apparent amplitude of ultrasonic transducer sidelobes by combining a scanning technique with automatic gain control.

Another embodiment of this invention, includes a permanently mounted Tracker in a building, include methods to modify the Tracker so that it automatically senses both the presence and the direction of a Beacon.

Another embodiment of this invention includes the use of coded Beacons in exit signs to transmit evacuation instructions to evacuees.

Another embodiment of this invention includes a Tracker with an omnidirectional transducer suitable for being lowered into sections of a collapsed structure to search for fallen firefighters.

Another embodiment of this invention includes the capability of the Tracker displaying an actual image of the fire scene. In this embodiment, the Tracker is converted to a multi-pixel receiver by use of an array ultrasonic transducer and a Fresnel zone plate. Like TICs, an imaging system using this technique would be able to "see through smoke." However, such a device could be considerably lower in cost than TICs. An ultrasonic imaging system of this type would have applications in detection of concealed weapon Other embodiments of this invention include methods to combine the ultrasonic Beacon/Tracker system with other technologies—particularly thermal imaging systems and video (visible optical) imaging systems. One such improvement includes adding a pulsing heat source to a Beacon so that the thermal imaging camera (TIC) can detect the Beacon. A second such embodiment involves incorporating the Tracker technology into the TIC, so that the camera can detect and display the strength of the received ultrasonic signal on the camera screen. This improvement significantly extends the TIC performance, which is normally limited to line-of-sight operation, by sensing reflected ultrasonic signals. A third embodiment combines the ultrasonic imaging version of the Tracker with both thermal and optical imaging systems for both fire scene applications as well as detection of concealed weapons.

Additional aspects, features and advantages of the present invention are also described in the following Detailed Description.

BRIEF DESCRIPTION OF THE SEVERAL VIEWS OF THE DRAWING

The invention will be more fully understood from the following detailed description taken in conjunction with the accompanying drawings in which.

DETAILED DESCRIPTION OF THE INVENTION

An apparatus providing an ultrasonic signal capable of penetrating a smoke filled environment that can locate and track an individual or an object is disclosed. As noted above, light and infrared energy are largely scattered by smoke particles due to their small wavelengths. Smoke particles will scatter ultrasonic waves much less than light waves so that ultrasonic waves can be used to provide a reliable signal link between two or more ultrasonic transceiver units due to the much longer wavelength of the ultrasonic waves. The ultrasonic waves communicating between two or more ultrasonic transceiver units can be used to provide data to allow the estimation of the azimuth direction between the units based on the received signal strength of the ultrasonic energy.

"Ultrasonic signal" as used herein refers to sound pressure waves that have a frequency greater than 20 KHz. Preferably, the ultrasonic signals that are described in the illustrated embodiments that follow have a wavelength of less than 10 mm, which corresponds to an ultrasonic wave having a frequency of at least 34 KHz.

Figure 1:
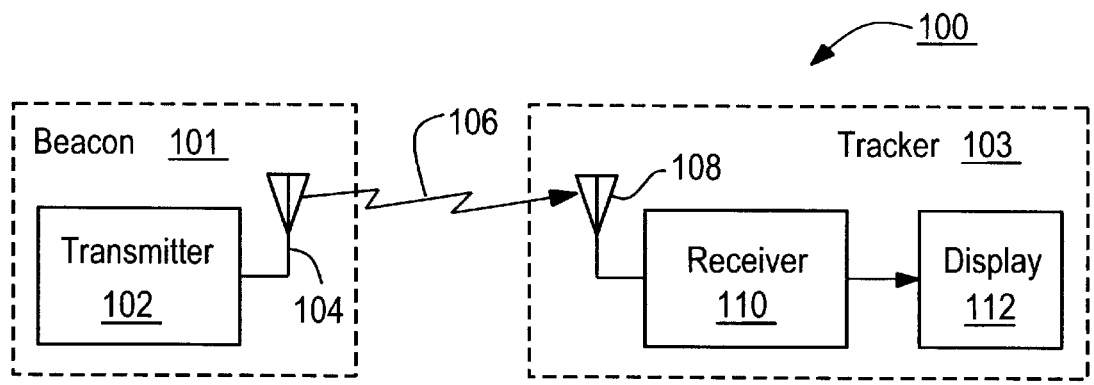
FIG. 1 is a block diagram of one embodiment of the present invention.

FIG. 1 illustrates a tracking and navigation system 100 in accordance with the present invention. The tracking and navigation system 100 includes a beacon unit 101 that is capable of transmitting an ultrasonic signal 106 to a tracker unit 103. The beacon unit 101 includes an ultrasonic transmitter 102 coupled to an ultrasonic antenna or an ultrasonic transducer 104 that provides an ultrasonic signal 106 at a beacon frequency in a substantially uniform pattern with respect to a horizontal azimuth angle. The tracker unit 103 includes a directional ultrasonic antenna or ultrasonic transducer 108 that has a predetermined beam-width that receives ultrasonic energy at the beacon frequency and is coupled to an ultrasonic receiver that provides a received ultrasonic signal strength level to an output device 112. The output device 112 provides indicia of the signal strength of the received ultrasonic energy 106. In this way, an azimuth angle to the beacon unit 101 can be estimated correlating the direction of the center of the tracker to the maximum signal strength of the received ultrasonic energy 106. The beacon transmitter 102 may be coupled to a motion sensor (not shown) that turns on the beacon if the beacon has not been moved in a predetermined period of time. This would perform sound an alarm if the firefighter is motionless for a specified period of time. Alternatively, the tracker unit may be combined with a thermal imaging camera (not shown) to provide direction information to the operator of the camera such to reduce the occurrence of false alarms such as burning embers in the shape of a person.

As used herein an ultrasonic antenna or ultrasonic transducers whether utilized for a transmitting or receiving, can be any device that is suitable for transmitting or receiving ultrasonic energy. In the illustrated embodiments that follow, an ultrasonic transducer is described that converts electrical signals into ultrasonic signals and transmits these ultrasonic signals into space and receives ultrasonic signals and converts these received ultrasonic signals into electrical signals. Different ultrasonic transducers have different transmit/ receive patterns indicative of the preferred directions, if any, in which transducer has more or less attenuation. A suitable ultrasonic transducer is manufactured by the Polaroid Corp., Cambridge Mass. The selection and configuration and arrangement of the one or more ultrasonic transducers necessary to provide the desired angular coverage for both the beacon unit 101 and the tracker unit 103 would be dependent upon the type of transducer(s) selected and the placement of the transducer(s).

The output device 112 provides a visual or audio indicia of the signal strength of the received ultrasonic signal 106. The display 112 can include a visual indication of the signal strength that may include varying the intensity of a single light source as a function of the measured signal strength, or a display in which a single light source is turned on and off at a rate that is a function of a measured signal strength. Alternatively, the signal strength may be indicated by using a plurality of light sources arranged in a linear orientation where the number of the light sources being illuminated is a function of the measured signal strength. Alternatively, the display may be an audio output in which the pitch of an audio signal is varied as a function of the measured signal strength. Alternatively, the audio signal may be pulsed on and off at a rate that is a function of the measured signal strength. Using this system, a first firefighter using a tracker unit could determine the relative direction to a second firefighter in a smoke filled environment. Through monitoring the signal strength of the received ultrasonic signal the first firefighter could locate the second firefighter. Similarly, a beacon unit placed on an exit from a room or building by firefighters as they enter the room or building to fight the fire could help a disoriented firefighter find the exit.

Figure 2:
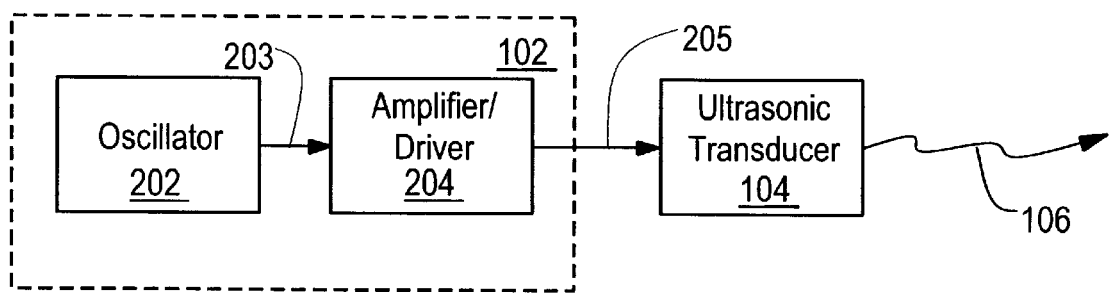
FIG. 2 is a block diagram of the transmitter 102 illustrated in FIG. 1.

FIG. 2 depicts a functional block diagram of the ultrasonic transmitter 102 and ultrasonic transducer 104 in greater detail. The ultrasonic transmitter includes an oscillator 202 that provides an output electrical signal 203 at a desired frequency. This electrical signal 203 is coupled to an amplifier/driver 204 that amplifies the electronic signal and provides a signal 205 that is suitable to drive the ultrasonic transducer 104 which transmits the ultrasonic wave. The desired frequency is the predetermined beacon frequency.

Figure 3:
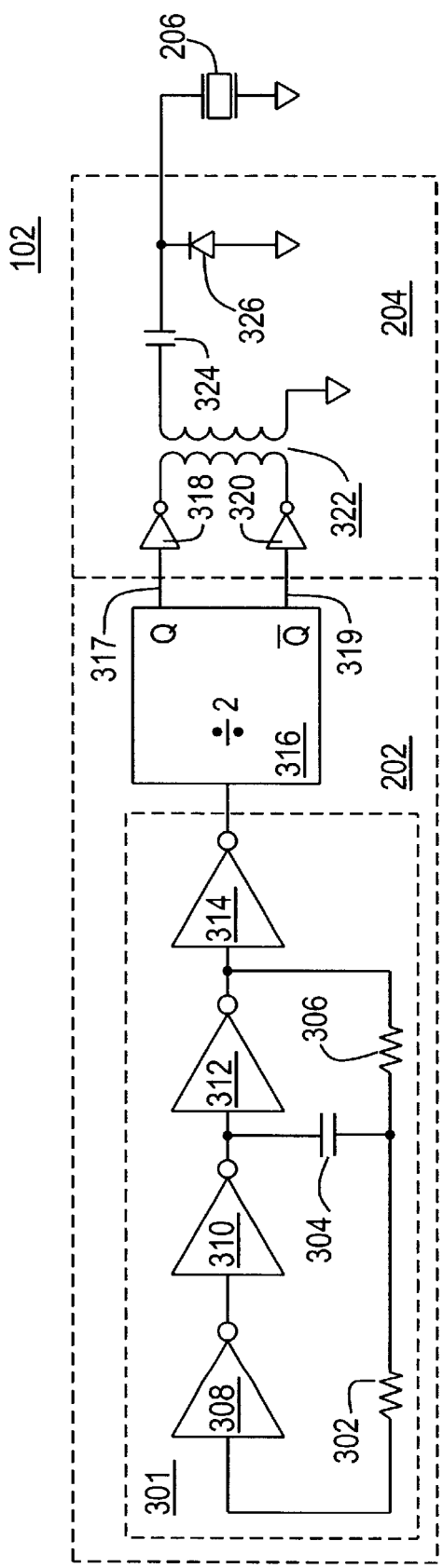
FIG. 3 is a schematic circuit diagram of the transmitter 102 illustrated in FIG. 1.

FIG. 3 depicts one embodiment of a circuit schematic suitable for use as a ultrasonic transmitter in a beacon unit. An oscillator unit 202 includes a simple RC oscillator 301 comprised of resistors 306 and 302, capacitor 314, and inverters 308, 310, 312, and 314. The simple RC oscillator 301 provides a square wave output at a frequency that is a function of resistor 306 and capacitor 314. The output of the RC oscillator 301 is divided in half by a frequency divider 316 that provides differential outputs 317 and 319. The differential outputs are provided to driver 204. The driver 204 includes inverters 318 and 320 that drive transformer 322. The signal from the secondary of transformer 322 has the DC level restored by capacitor 324 and diode 326. This DC restored signal then powers ultrasonic transducer 206. Preferably, the beacon is batter powered, light weight and portable.

In one embodiment, the inverters used are a CMOS 4049, the frequency divider is a CMOS 4013 D flop-flop configured as a frequency divider, the transformer has a turns ratio of 17/371. The values of the various resistors, capacitors, and diodes in the circuit will be dependent upon the particular beacon frequency, the type of ultrasonic transducer selected, and other system requirements that are unique to each application. It should be appreciated that other circuits could be substituted for those in the illustrated embodiment and that the illustrated embodiment is just one of many different circuits suitable for use in the present invention.

Figure 4:
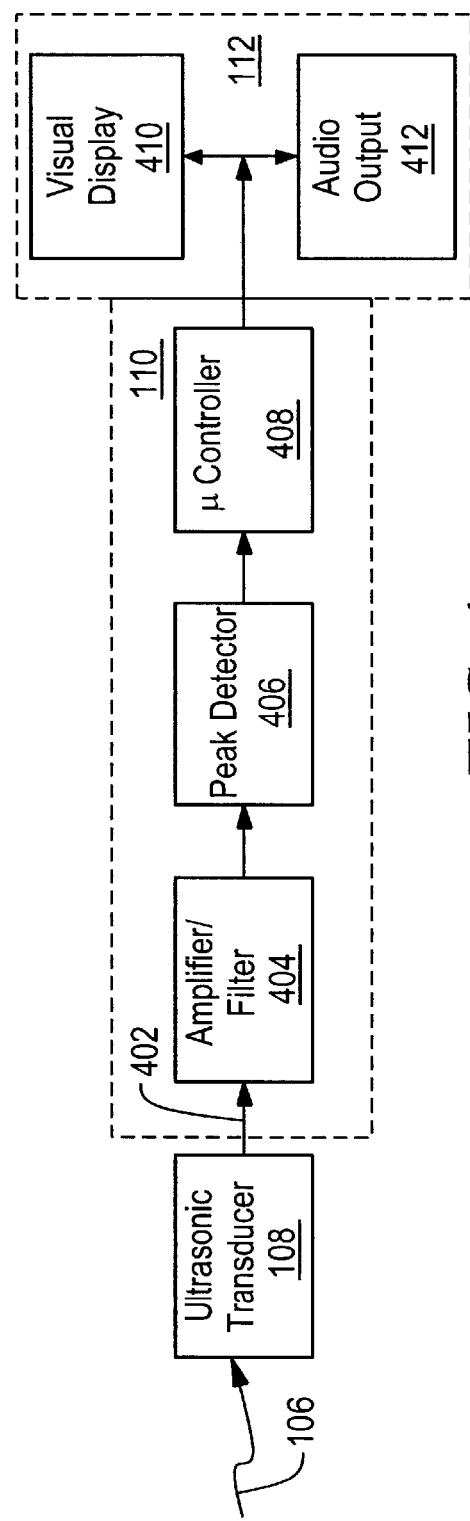
FIG. 4 is a block diagram of a receiver 110 depicted in FIG. 1.

FIG. 4 depicts a functional block diagram of an ultrasonic receiver suitable for use in a tracker module 103. Ultrasonic transducer 108 receives the ultrasonic signal 106 and converts the ultrasonic signal 106 into an electrical signal 402. The electrical signal 402 is provided to an amplifier/filter that amplifies the electrical signal 402 and filters out other extraneous signals. A peak detector 406 is used to store the peak value of the amplified and filtered signal. The peak value is then provided to a micro-controller or microprocessor 408 that digitizes the peak value and provides an appropriate output for a display device 112. The display device 112 may include a visual display or an audio output of the received signal peak level or both.

Figure 5:
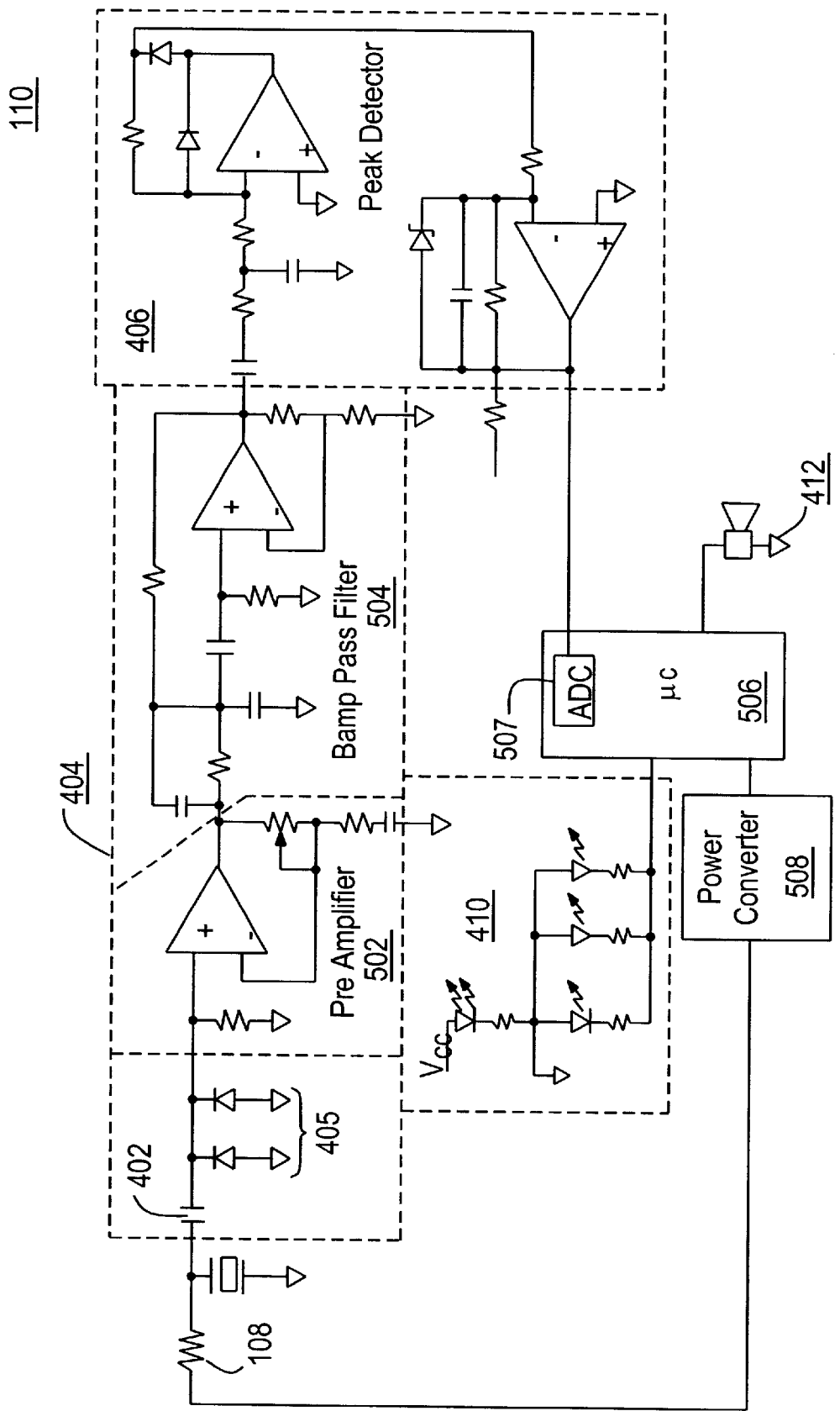
FIG. 5 is a schematic circuit diagram of the receiver 110 depicted in FIG. 4.

FIG. 5 depicts a schematic circuit diagram of an ultrasonic receiver suitable for use in a tracker module 103. Ultrasonic transducer 108 converts received ultrasonic energy into an electrical signal. This electrical signal is AC coupled via capacitor 402 and limiter circuit 403 to a preamplifier 502. The preamplifier 502 is an op-amp amplifier configured as a non-inverting amplifier. The preamplified signal is then filtered by bandpass filter 504. The peak value of the preamplified and filtered signal is determined and stored by peak detector 406. A micro-controller or micro-processor 506 that includes an analog-to-digital converter (ADC) 507 is used to provide the appropriate signals to a visual display 410 or an audio output 412. The visual display 410 can include a plurality of light emitting diodes configured and arranged such that the number of light emitting diodes illuminated is indicative of the peak value of the preamplified and bandpass filtered signal. A power converter coupled to the micro-controller or micro-processor 506 provides the necessary voltage and current to power the ultrasonic transducer. In one embodiment, the micro-controller 506 is a PIC16F876/873 and the operational amplifiers are Tl084. The TL084 is manufactured by Texas Instruments and the PIC16 F876/873 is manufactured by Microchip, Inc., of Chandler, Ariz. Other op-amps having similar characteristics to the TL084 could be used as well. The values of the various resistors, capacitors, and diodes in the circuit will be dependent upon the particular beacon frequency, the type of ultrasonic transducer selected, and other system requirements that are unique to each application. It should be appreciated that other circuits could be substituted for those in the illustrated embodiment and that the illustrated embodiment is just one of many different circuits suitable for use in the present invention.

Figure 6:
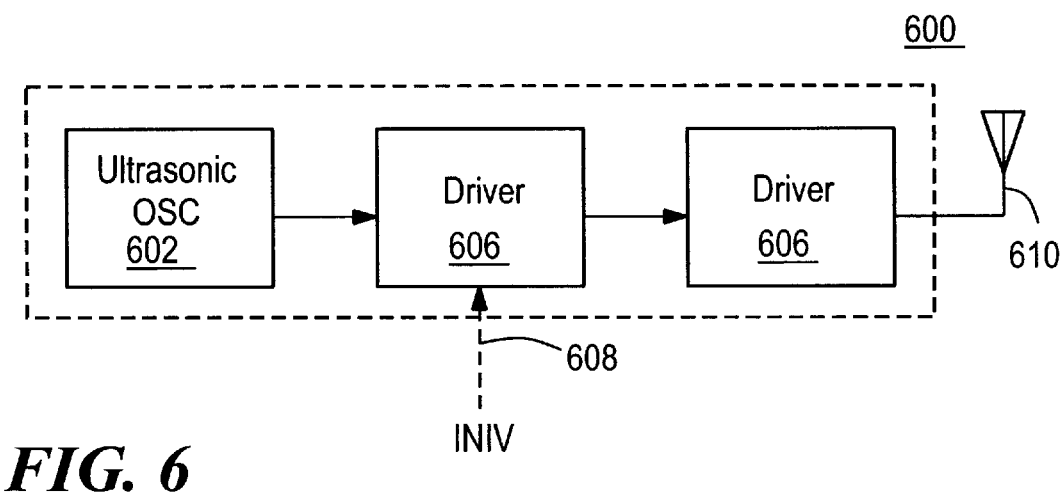
FIG. 6 is another embodiment of the present invention.

FIG. 6 depicts a functional block of another embodiment of a ultrasonic transmitter 600 suitable for use with the present invention. The transmitter 600 includes an oscillator 602 that provides electrical signals, which have a frequency equal to the beacon frequency, to a modulator 604. The modulator 604 provides a modulated signal having a signal frequency equal to the beacon frequency to the driver 606 that powers the ultrasonic transducer 610.

The modulator 604 may be a pulse modulator that provides on/off switching of the electrical signal in order to provide a pulsed ultrasonic signal from the ultrasonic transducer. In general, a pulsed signal will have a lower average power consumption than a continuous signal system. This may be important in some systems where the system is battery powered and battery life is an important consideration.

Figure 7:
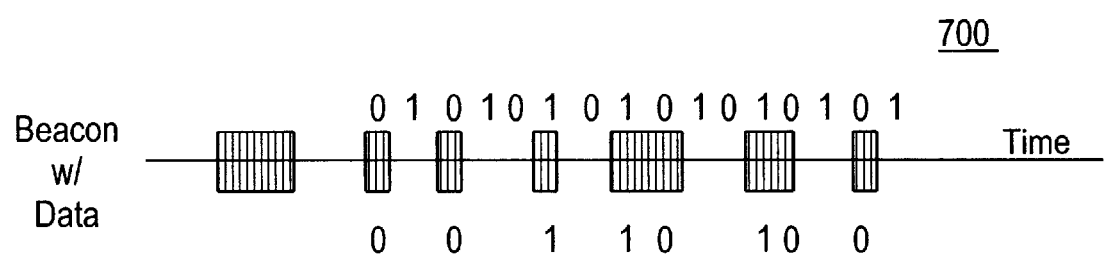
FIG. 7 is a graph of data encoded as digital data added to the ultrasonic signal by pulse modulation.

In addition to providing longer battery life, a digitally encoded data may be added to a pulse modulated ultrasonic signal. The encoded digital data can be added to the ultrasonic signal using various forms of pulse modulation. Exemplary modulation schemes that are suitable can include pulse position modulation, pulse width modulation, and pulse amplitude modulation. FIG. 7 depicts a waveform 700 using pulse position modulation to transmit an 8-bit data word. The waveform 700 includes a sync pulse 702 followed by a 8 bits of data encoded in a series of pulses using pulse position modulation. Each bit of data is encoded by the position of the pulse in either a "0" position or a "1" position. As can be seen 8 bits of data are encoded in 6 pulses where a "1" on a first bit followed by a "0" in the next subsequent bit are encoded as a single pulse. Similarly, a "0" on a first bit followed by a "1" in the next subsequent bit are encoded as a single pulse. An 8-bit data word is shown for exemplary purposes only. The data word may include more or less than 8 bits and the selection of the size of the data word is a function of the system requirements.

The encoded data added to the ultrasonic signal can be used to uniquely identify an individual, an object such as a container storing hazardous chemicals, or an exit from a building or room that the beacon is attached to, or is proximate to. If the unique identifier is to be used for identifying individuals, a list identifying the individual firefighter, for instance, and the corresponding unique identifier for that individual may be prepared and stored in a database. If the unique identifier is to be used for identifying stored materials a standard identifier may assigned to an object and the list of identifiers and the corresponding identified objects may be prepared and stored in a database. If the unique identifier is to identify exits from a building or particular rooms within the building, the location of the beacons can be ascertained earlier in time and stored in database. Alternatively, a beacon having a unique identifier may be placed by firefighters in a building identifying, for example, a particular exit. In this case the firefighters would keep track of the unique identifier assigned to a particular exit. In addition, an environmental sensor (not shown) that measures some characteristic of the environment such as air temperature, temperature rate of rise, ambient pressure, and concentrations of gasses including oxygen, carbon dioxide, and carbon monoxide, can be coupled to the pulse modulator to digitally encode the measured characteristic. Additionally, the beacon unit may include sensors to monitor the firefighters vital signs such as heart rate, blood oxygen level, and respiration rate, as well as air tank pressure. Although the illustrative embodiment is for an 8-bit data word, data words may be selected that are less-than or greater-than 8 bits.

Alternatively, a pulsed system could be used in which individual ultrasonic frequencies could be used to uniquely identify individuals, objects, or exits. In this case, the each beacon would be assigned an individual frequency that would not interfere with other beacons. The frequencies would have to be sufficiently separated to allow for the Doppler shift caused by the movement of the firefighter. As such there would be a limited number of beacons that could be used in a particular location.

Figure 8:
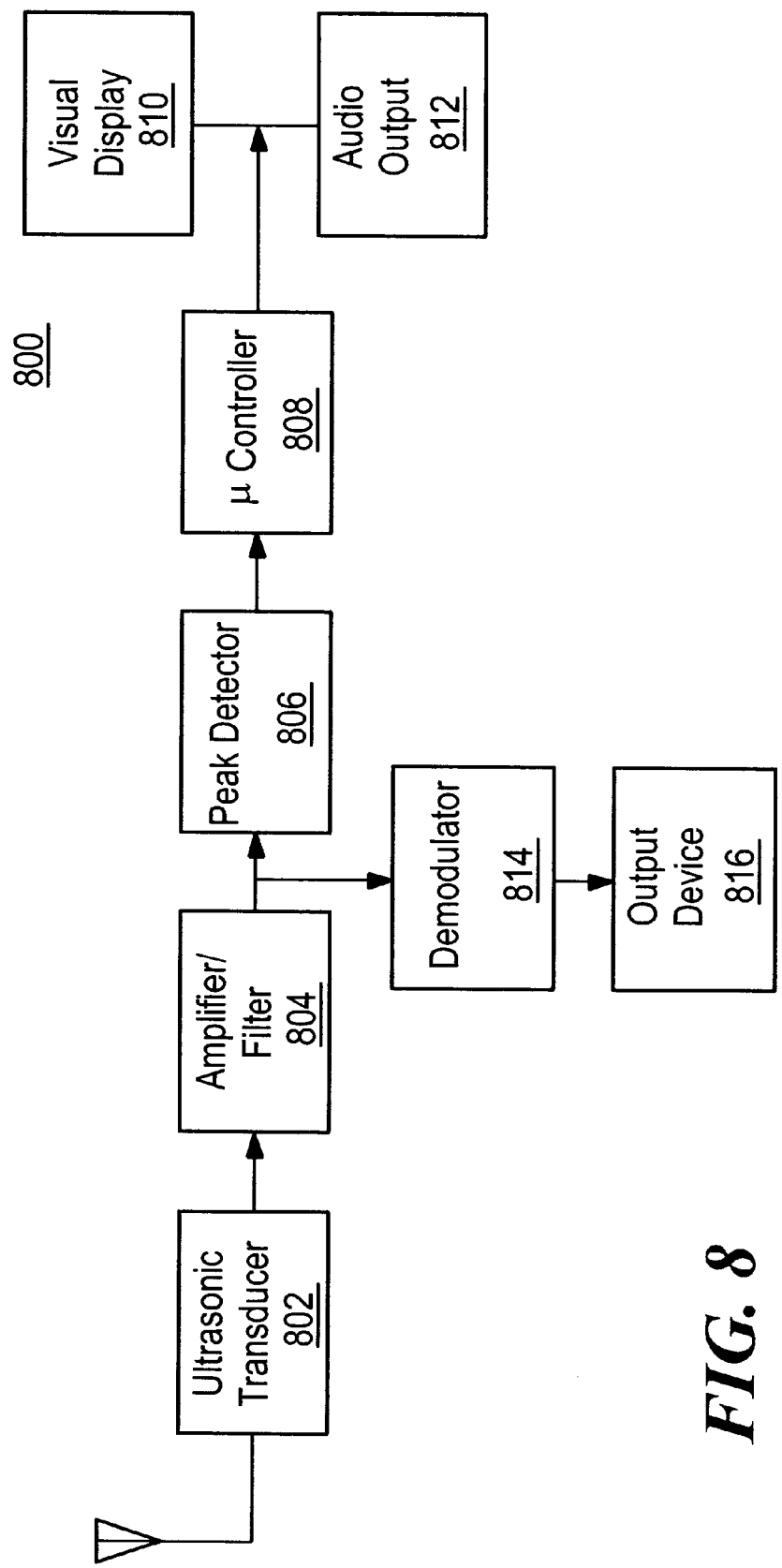
FIG. 8 is another embodiment of the receiver 608 illustrated in FIG. 6.

FIG. 8 depicts a functional block of another embodiment of a ultrasonic receiver 800 suitable for use with the transmitter depicted in FIG. 6. The receiver 800 includes the basic receiver depicted in FIG. 4 and described therewith. In the event that the transmitter ultrasonic signal is modulated as depicted in FIG. 6 and 7, a demodulator module 814 is coupled to the amplifier/filter module 804, and an output device 816 coupled to the demodulator module 814. The demodulator 814 is configured and arranged to provide the inverse functionality of the modulator provided in FIG. 6. The output device 816 can be a display that is used to display any demodulated and decoded data that has been added to the ultrasonic signal. In addition, the demodulator can be coupled to a database (not shown) used to store the various digital codes and the corresponding data so that the information corresponding to the digitally encoded data.

The use of binary coding of information within the ultrasonic signal would allow the beacon unit to provide specific information to a firefighter. This information could include specific types of hazardous materials. The data encoded and added to the ultrasonic signal could be coordinated with standard material lists such as the four-digit coding of materials used by many fire departments. The tracker could display the particular hazardous material code or could display the corresponding material such as "high explosive", "chlorine gas", or "sodium, do not use water." If the beacon were to indicate an exit, the data may specifically include directions or information pertinent to firefighters such as "exit 10 feet left", or "stairwell." Beacons could be used to identify specific dangers as well such as pits or stairwells without doors. Beacons could be used to direct firefighters to specific rooms in a building where people are usually located, and provide data on the number of people in the particular room.

Figure 9:
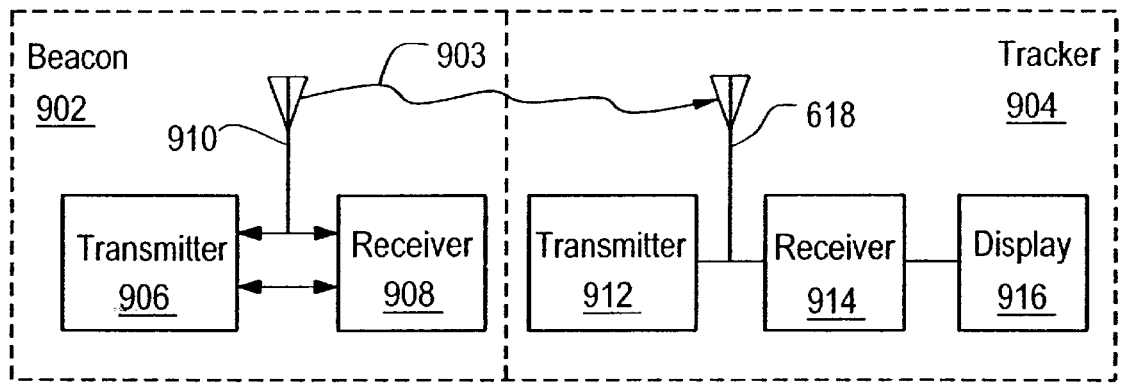
FIG. 9 is a block diagram of another embodiment of the present invention.

FIG. 9 illustrates another embodiment of a tracking and navigation system 900 in accordance with the present invention. The tracking and navigation system 900 includes a beacon unit 902 that is coupled via an ultrasonic signal 903 to a tracker unit 904. The beacon unit 902 includes a transmitter 906 and a receiver 908 coupled to a ultrasonic transducer 910. The tracker unit 904 also includes a transmitter 912 and a receiver 914 coupled to a ultrasonic transducer 918. An output device 916 is coupled to the receiver 914 to provide any necessary outputs. The output device can include visual displays or audio outputs to provide indicia of the signal strength of the received ultrasonic signal.

In this embodiment, the tracker unit 904 interrogates the beacon unit 902 with an interrogation pulse and the beacon responds with an answer pulse. To avoid self-interference the beacon unit may transmit an ultrasonic signal having a beacon frequency, and the tracker unit may transmit an ultrasonic signal having a separate tracker frequency. Alternatively, the tracker unit 904 sends an interrogation pulse having a first pulse width. Upon receiving the interrogation pulse the beacon would respond with an answer pulse having a second pulse width. The interrogation and answer pulses may, or may not, have the same frequency. So long as a specific delay and specific pulse widths are used, self interference may be avoided. In this way, the tracker would not be confused or spoofed by a reflection of its own signal.

Figure 11:
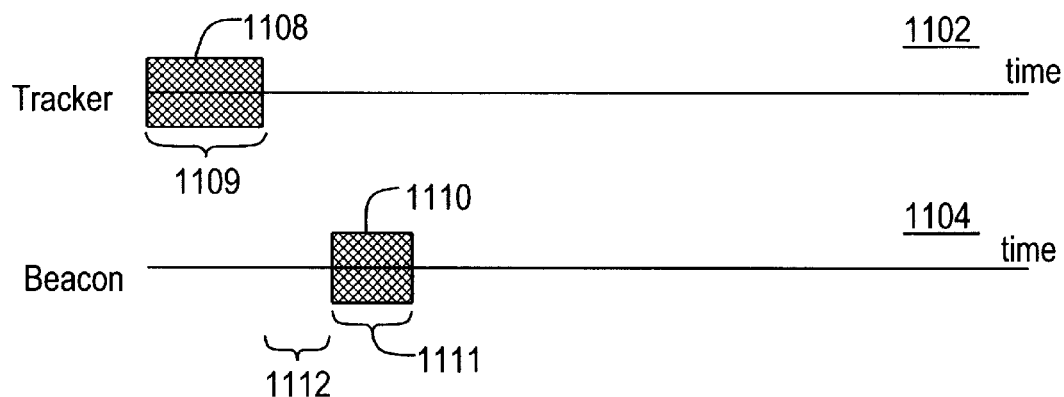
FIG. 11 is a graph illustrating an interrogation pulse and an answer pulse suitable for use in the embodiment depicted in FIG. 9.

Another advantage of the use of interrogation pulse and answer pulse is the ability to accurately determine the distance between the beacon unit and the tracker unit. By measuring the time duration from the time the interrogation pulse is transmitted to the time the answer pulse is received, the tracker unit can estimate the distance between the beacon unit 902 and the tracker unit 904. This is illustrated in FIG. 11 which depicts in graph 1102 an interrogation pulse 1108 transmitted from the tracker unit having a first pulse width 1109. The beacon unit responds after a time delay 1112, which is proportional to the distance between the tracker unit and the beacon unit, and responds with an answer pulse 1110 having a second pulse width 1111. The delay from the end of the interrogation pulse to the tracker unit receiving the answer pulse will be twice the distance between the two units. In this way, by measuring the time of arrival (TOA) of the answer pulse, the distance between the two units is ascertainable. A suitable display mounted on the tracker unit such as an LED numeric display (not shown) could be used to display the distance to the beacon.

Using this system, a first firefighter having a tracker unit and who is in communication with a second firefighter could direct a second firefighter toward themselves. The first firefighter could continuously monitor the direction and distance to the second firefighter and direct the movements of the second firefighter accordingly.

In another embodiment, the transmitter 906 of the beacon unit 902 of the tracking and navigation system 900 can contain a modulator block as depicted in FIG. 6, and the receiver 914 of the tracker 904 can contain a demodulator module and output module as depicted in FIG. 8. In this way, after receiving the interrogation pulse, the beacon unit 902 can communicate data that is digitally encoded and added to the pulse modulated beacon signal received by the tracker unit. As described above with reference to FIGS. 6 and 7 various types of data may be encoded within the beacon signal including unique identifiers for people, objects, rooms, and exits from buildings. As described above with respect to FIG. 8, the demodulator in the tracker unit would demodulate and decode the received ultrasonic signal and provide an appropriate output.

Using this embodiment, a firefighter could use the directional capability of the tracker to interrogate specific beacons to ascertain their direction and distance. Another advantage to the use of an interrogation pulse and answer pulse is the ability of the beacon unit to be maintained in a low-power listening mode. In this manner, the firefighter would turn on the beacon by interrogating the beacon when needed. Such a beacon could be powered by long life lithium batteries and would require a new battery only every 1–2 years if the power drain were sufficiently low.

In an alternative embodiment, both of the transmitters 906 and 912 contained within the beacon unit 902 and the tracker unit 904 can contain a modulation block as depicted in FIG. 6. Similarly, both of the receiver 908 and 914 contained within the beacon unit 902 and the tracker unit 904 respectively can contain a demodulation block as depicted in FIG. 8. In this embodiment, two way communication can occur between the tracker unit 904 and the beacon unit 902. If an audio input is added to the modulation block in FIG. 6 and an audio output is provided to the demodulation module in FIG. 8, voice communication between the two units can occur. Pulse modulation or other known modulation schemes suitable for modulating a carrier signal with voice data can be used. The pulse rate would need to be selected to provide sufficient sampling of the audio signal to provide a suitable audio output. An audio input/output could be microphone placed inside the helmet of the firefighter. If the distance measuring and digitally encoded capability described above was desired, a second ultrasonic signal having a second ultrasonic frequency would be utilized for this purpose.

Figure 10:
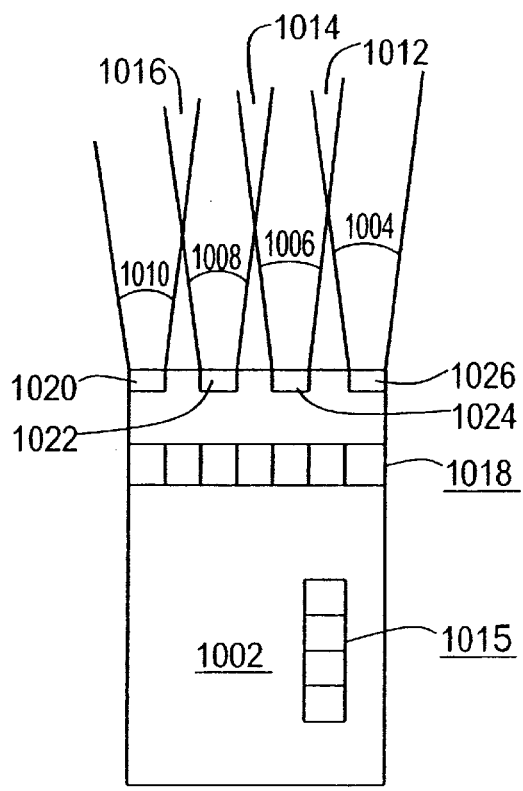
FIG. 10 depicts a block diagram of another embodiment of the present invention.

FIG. 10 illustrates another embodiment of a tracking and navigation system that allows a tracker unit to provide indicia directly of the azimuth angle to the beacon unit from the tracker. As depicted in FIG. 10, a tracker 1000 is depicted in which a plurality of ultrasonic receivers (not shown) correspond to a plurality of ultrasonic transducers 1020, 1022, 1024, and 1026. The ultrasonic transducers are configured and arranged in a one-dimensional linear array, wherein each receiver associated with each ultrasonic transducer will provide a signal strength signal of the received ultrasonic wave at each of the receivers. Each of the plurality of ultrasonic transducers has a receive signal pattern that includes a beam width corresponding thereto.

In the illustrated embodiment, ultrasonic transducer 1020 can receive ultrasonic signals within the area subtended by angle 1010. Ultrasonic transducer 1022 can receive ultrasonic signals within the area subtended by angle 1008. Ultrasonic transducer 1024 can receive ultrasonic signals within the area subtended by angle 1006, and ultrasonic transducer 1026 can receive ultrasonic signals within the area subtended by angle 1004. In order to avoid having null-spots in the receiver coverage the areas subtended by each of the ultrasonic transducers overlaps. In the illustrated embodiment overlap area 1012 corresponds to an overlap between ultrasonic transducers 1026 and 1024, overlap area 1014 corresponds to an overlap between ultrasonic transducers 1024 and 1022, and overlap area 1016 corresponds to an overlap between ultrasonic transducers 1022 and 1020. Processing the signal strengths provided by each of the ultrasonic receivers would allow the azimuth angle between the beacon and the tracker to be directly calculated or determined. A linear array of light emitting diodes 1018 can be configured and arranged to provide indicia of the calculated or determined azimuth angle. A second linear array of light emitting diodes 1015 can be provided to display an indicia of the signal strength of the received ultrasonic signal at the receiver most closely aligned with the azimuth angle.

Alternatively, the ultrasonic transducers can be arranged in a two-dimensional array in which each ultrasonic transducer has a receive signal pattern that subtends a solid angle, so that the two-dimensional array will provide coverage in both azimuth between the beacon and tracker and in elevation between the beacon and the tracker. By processing the signal strength signals of the received signal strength from each of the ultrasonic receivers corresponding to each of the ultrasonic transducers, the tracker is able to locate a beacon unit both in terms of azimuth angle and in elevation angle. In addition, an indicia of the signal strength of the received ultrasonic signal from the ultrasonic receiver most closely aligned with the location of the beacon unit can be provided.

If an 8×8 array of ultrasonic transducers and corresponding receivers were used the display could include an array of 15×15 LED's. In this way, there would be an LED placed in between each pair of LED's corresponding to individual ultrasonic receivers. Averaging or otherwise interpolating the intensity of the adjacent LED pairs would allow a smoother image to be formed. The resolution of this embodiment could be increased so as to allow the 2-dimensional system to act as an ultrasonic imaging system for an entire room. The resolution of the system would be limited by the wavelength of the ultrasonic signals, approximately 10 mm or less, but would allow the ability to roughly image a room without degradation due to scattering of the signal due to the smoke.

In another embodiment, a directional beacon unit could contain 2 or 3 ultrasonic transmitters and ultrasonic transducers. In this embodiment, each transmitter/transducer combination would be used to provide a directional capability for the firefighters. By assigning a particular ultrasonic frequency, or digital code, or both, to a particular direction, a firefighter could use the directional beacon to determine the direction the firefighter approached the directional beacon from, as well as the direction the firefighter headed. In another embodiment, the directional beacon could store the particular unique identifier of the firefighter and the time the firefighter passed the directional beacon and direction the firefighter was going.

In another embodiment, a unit commander outside the building can be linked to any fixed beacon within the building via an external communication system such as radio link, a hard wired system, or a power-line communications system. In this way, the unit commander would be able to interrogate each of the fixed beacons and rapidly assess the temperatures within the building, any hazardous materials located within the building as well as the locations of various firefighters. Such information could be coordinated with the building blueprints to aid in the fire fighting strategy.

Figure 12:
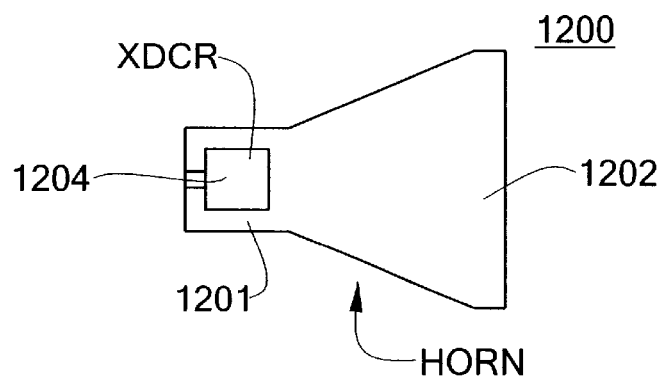
FIG. 12 shows the use of an acoustic horn to narrow the transducer beam angle.

If no beam-shaping structures are employed, the Tracker beam pattern will be determined by the transducer beam pattern. However, many of the readily-available transducers that are environmentally protected are relatively small and have a relatively wide beam pattern. In order to reduce the beam angle of the Tracker and thus make the unit more directional, a cone or horn structure 1200 having a narrow neck 1201 and a wider output orifice 1202, can be added as in FIG. 12. It has been observed that by recessing the transducer 1204 in the neck 1201 of the horn, an omnidirectional transducer will behave more like a directional transducer.

A fire scene is a relatively noisy environment due to the firefighting equipment, such as hose nozzles, self-contained breathing apparatus (SCBA), horns, etc., as well as from the sounds of fire itself. In particular, the "crackling" sound of a fire tends to have significant harmonics, many of which are in or near the ultrasonic bands used by the Beacons and Trackers. Furthermore, improved versions of the Tracker must respond to a particular Beacon frequency in the presence of other Beacons operating at different ultrasonic frequencies. In order that the Tracker not respond to these interfering signals, it is desirable to have a narrow-band receiver in the Tracker. Conventional narrow-band filters using active or passive elements (such as resistors, capacitors, inductors and operational amplifiers) have a number of limitations, including: (1) the center frequency is highly dependent on component tolerances; (2) high-Q filters are difficult to make, and (3) component drift due to aging and temperature changes causes drift in the center frequency. Furthermore, since the Tracker is intended to operate at several different frequencies, a tunable filter is desirable.

Figure 13:
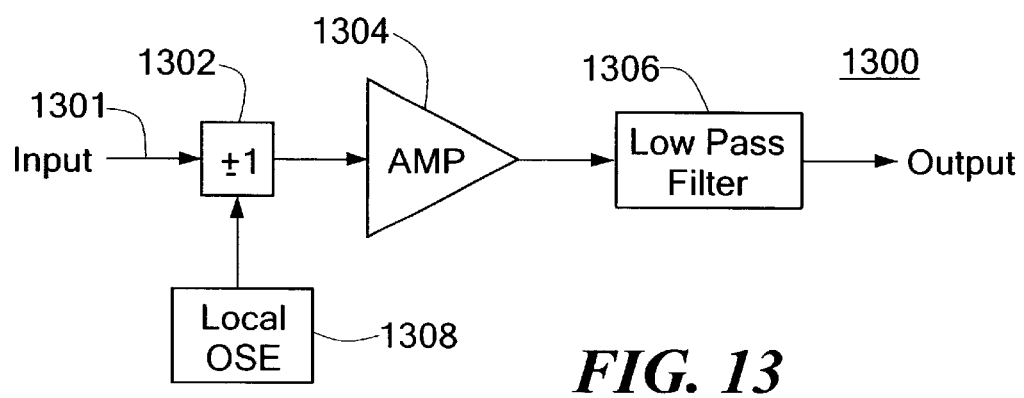
FIG. 13 is a block diagram of a narrow-band, tunable filter.

Such a filter can be realized by using the circuit 1300 of FIG. 13, which is somewhat similar to the heterodyne systems commonly found in AM radios. However, the circuit 1300 of FIG. 13 differs from AM radios in that the desired information is the amplitude of the carrier, rather than the signal in the sidebands adjacent to the carrier. The circuit 1300 operates as a detector for any signal at the frequency of and in phase with the local oscillator 1304. In particular, an input signal 1301 is provided by the transducer (not shown) to the a mixer 1302. The mixer 1302 is further coupled to a local oscillator 1308 that provides a local oscillator signal to the mixer 1304. The mixer 1304 mixes the two signals together to form an output signal that is provided to a low pass filter 1306. The output of low-pass filter 1306 will be positive for signals with 0 degrees relative phase to the local oscillator signal and will be negative for signals with 180 degrees phase relative to the local oscillator signal. Signals in quadrature (at 90 degrees or 270 degrees) will produce zero output. Since the signal from a Beacon will have an unknown phase, a second circuit 1300 of FIG. 13 is required for the quadrature signals.

Figure 14:
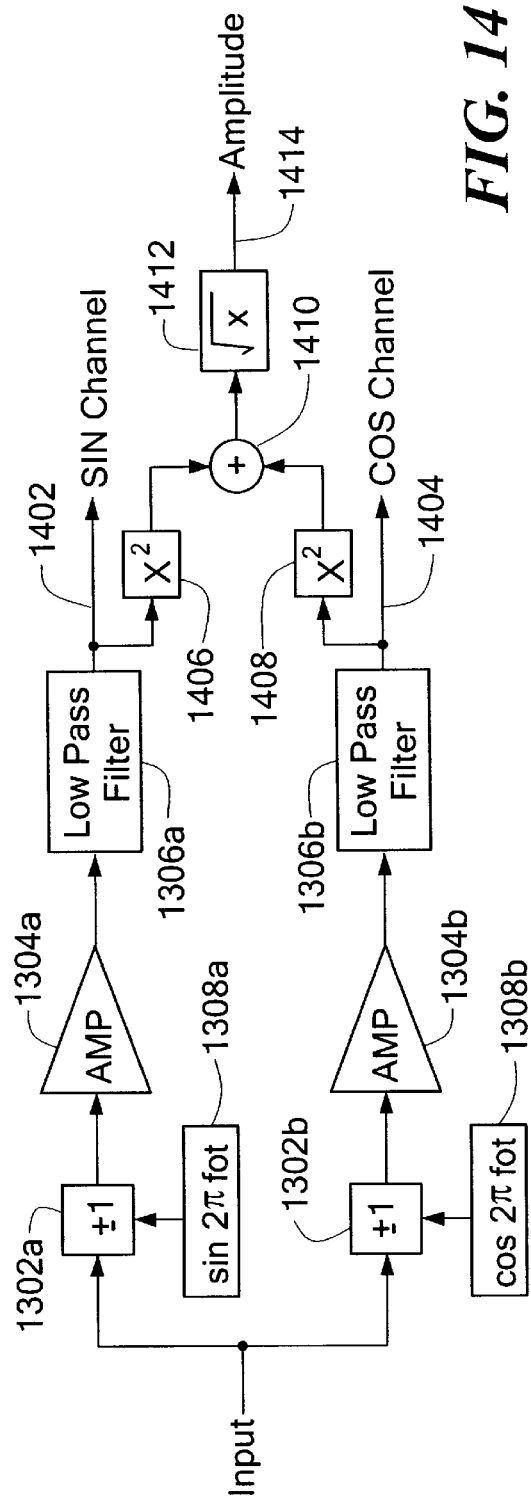
FIG. 14 is a block diagram of a narrow-band, quadrature, tunable filter.

This configuration is depicted in FIG. 14 in which the in-phase receiver includes mixer 1302*a*, local oscillator 1308*a*, amplifier 1304*a*, and low pass filter 1306*a*. Similarly, the quadrature-phase receiver includes mixer 1302*b*, local oscillator 1308*b*, amplifier 1304*b*, and low pass filter 1306*b*. By using this circuit, the amplitude of both the in-phase signal (0 or 180 degree) and the quadrature-phase signal (90 or 270 degree) can be measured. If the amplitude of the combined signal is desired, this can be derived by calculating the square root of the sum of the squares (RSS) of the sine and cosine channels as depicted in FIG. 14 wherein the in-phase component 1402 is squared by square module 1406, the quadrature-phase component 1404 is squared by square module 1408 and the two squared values are added in adder 1410. The square root is taken of the sum output from adder 1410 by square root module 1412 to provide RSS output signal 1412. For microprocessor-based systems, the sine and cosine channels can be separately digitized by A/D converters, and the RSS calculation can be implemented digitally in software or firmware. The advantage of using the circuit of FIG. 14 over conventional band-pass filters is that the center frequency can be easily varied and controlled simply by changing the frequency of the local oscillator. Furthermore, the bandwidth of the filter is determined by the bandwidth of the low pass filter, and this can be easily made quite narrow with readily available components. In addition, any drifting in the component values has no effect on the center frequency and only slightly affects the filter bandwidth. Thus, narrow-band tunable filters can be implemented by the circuit of FIG. 14. An additional advantage of using this circuit for the Beacon/Tracker system is that both the transmit frequency of the Beacon and the center frequency of the filter can be crystal controlled and thus can be matched. The only variations in frequency between the Beacon transmit frequency and the Tracker local oscillator will be due to frequency tolerance in the crystals and any Doppler shift due to relative motion between the Tracker and Beacon. In typical situations, the bandwidth of the filter (i.e., the bandwidth of the low pass filter in FIG. 14) is determined by the Doppler shift, rather than the crystal variations. Thus by using the circuit of FIG. 14, a switchable narrow band filter can be used to determine the amplitude of the Beacon signal and reject interfering noise.

The RSS calculation to determine the magnitude of the combined signals can be accomplished by exact methods (squaring, adding and square-rooting) in firmware. Alternatively, a simple algorithm of adding 40% of the magnitude of the channel with the smaller amplitude to 100% of the magnitude of the channel with the larger amplitude will estimate the total magnitude to better than 5%. In addition, the algorithm is much easier to implement and results in faster calculations. Since the fraction $3/8=0.375$ is close to 40%, a simple digital algorithm is to shift the smaller magnitude two bit positions to the right to generate a value $1/4$ of the magnitude, shift one more time to generate $1/8$ of the magnitude, and then add the two shifted values (which total $3/8$ of the smaller magnitude) to the larger magnitude. This technique requires no multiplications, which are time consuming for digital processors, and uses only shifts and adds, which are very fast.

Figure 16:
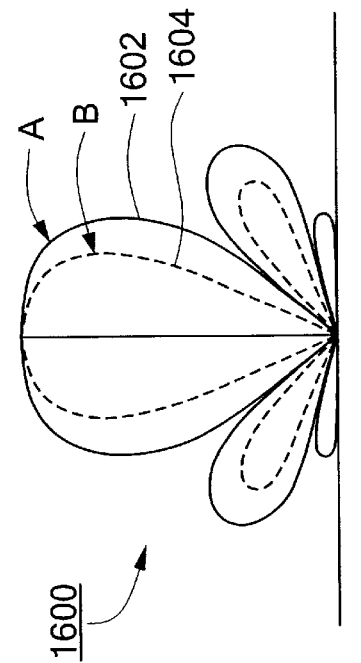
FIG. 16 depicts the resulting sidelobes of the ultrasonic transducer modified as in FIG. 15.
Figure 15:
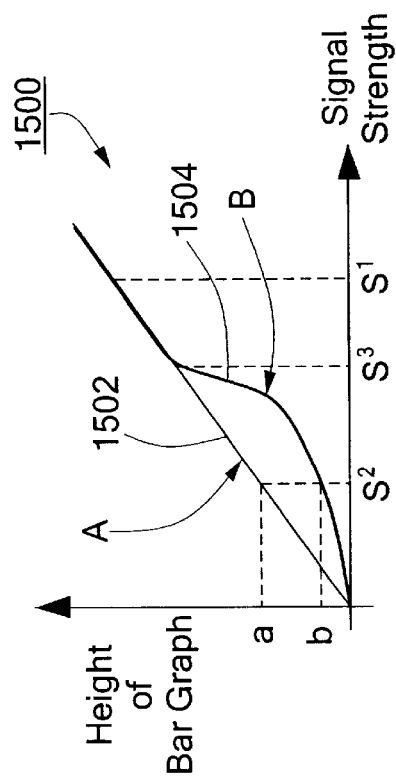
FIG. 15 depicts the performance of an embodiment which reduces the effective sidelobes of the ultrasonic transducer.
Figure 17:
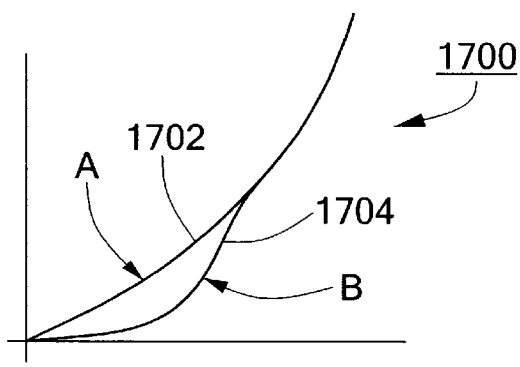
FIG. 17 depicts the resulting sidelobes of a non-linear system using an ultrasonic transducer modifier as in FIG. 15.

For situations in which an ultrasonic transducer has significant side lobes in its beam pattern, so that the Tracker would have a wider-than-desired beam pattern, an adaptive AGC/squelch can be employed in conjunction with a scanning motion to reduce the sensitivity of the side lobes. The result is a Tracker with a perceived narrower beam pattern. Assume that the user has a Tracker and is scanning a room, much like one would scan a dark room with a flashlight. By storing the maximum signal received over the time of a few scans, the transfer function of the system can be modified to reduce the displayed amplitude of those signals which are significantly below the stored maximum. This concept is illustrated in FIG. 15. The normal operation is illustrated as curve 1502 labeled as "A", in which the height of the displayed bar graph is linearly related to the received signal strength. Assume the unit detects a signal at level S1 in a particular direction due to the main lobe of the beam pattern, and another signal at level S2 in a different direction due to a side lobe in the beam pattern, where S1>S2. By adjusting the gain so that signals below S3 have a lower gain, where S2<S3<S1, then the level at S2 would be displayed at a height of "b" rather than "a". The effect on the beam pattern is shown in FIG. 16 for curve 1602 "A" and curve 1604 labeled "B". Note that the method can be applied to systems that are inherently nonlinear, as in FIG. 17, with the same effect of reducing signals which are below the maximum received signal as shown on curve 1702 labeled "A" and curve 1704 labeled "B". Note that the stored level of the maximum signal should be periodically "reset" or designed to be automatically reduced over time to allow the Tracker to adapt to varying signal levels. Such operation would be similar to peak detectors which decay to zero in the absence of signal.

Figure 18:
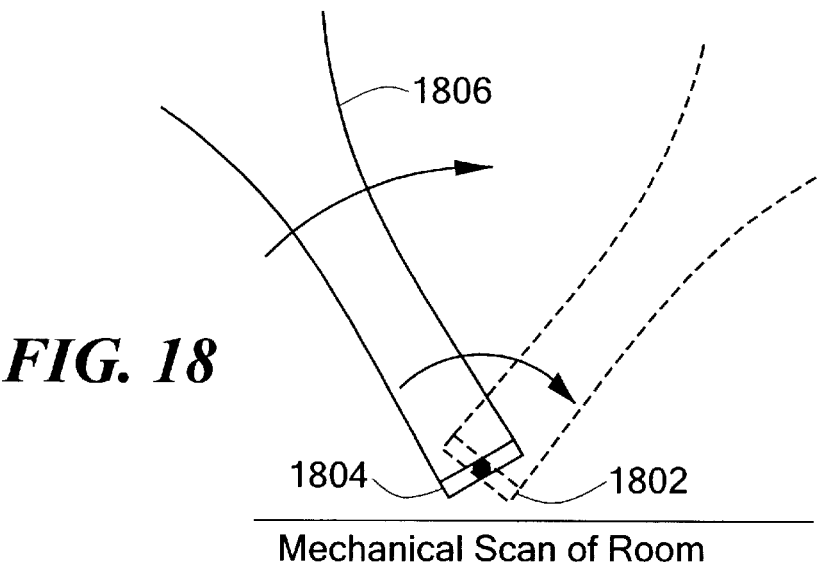
FIG. 18 depicts a method of mechanically scanning a room with a Tracker.
Figure 19:
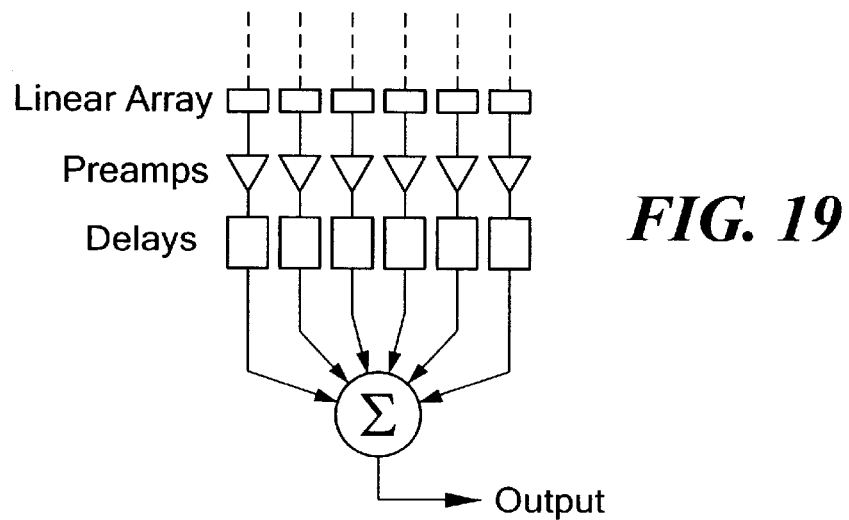
FIG. 19 is a block diagram of a system to electronically scan an area with a transducer array.

As discussed above, one embodiment of the Beacon/Tracker system incorporates an omni-directional Tracker permanently mounted in specific locations within a room or building, such as at an exit. A modified version of this system would use several directional Trackers with overlapping beams, so that the presence and direction of a Beacon could be determined. An alternative implementation of this concept is to make a single Tracker capable of mechanically or electronically scanning a room. FIG. 18 illustrates the use of a mechanical scan. In this example, a motorized mechanism 1802 would physically rotate the transducer 1804 back and forth in order to scan ultrasonic signal 1806 about the area of the room adjacent to the location of the transducer 1804. In FIG. 19, an embodiment employing an electronic scan method is shown. Signals are received in separate elements of the transducer 1901 and by separately adjusting the delay for each channel by delay module 1903, the transducer can be made to electronically scan the room. A preamplifier 1902 may be used and inserted between the delay module 1903 and the corresponding transducer 1901. In one embodiment, the delay modules 1903 are delay lines. In another embodiment, the signals from the array elements could be digitized and delayed in software by using signals digitized at different times within the delay module 1903. This latter method is particularly attractive to the present invention because of the low-frequency nature of the signals and the availability of high-speed microprocessors.

Figure 20A:
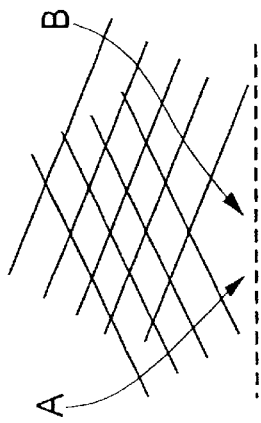
FIG. 20 depicts a method to use the system of FIG. 19 to provide simultaneous scans in all directions.
Figure 20B:
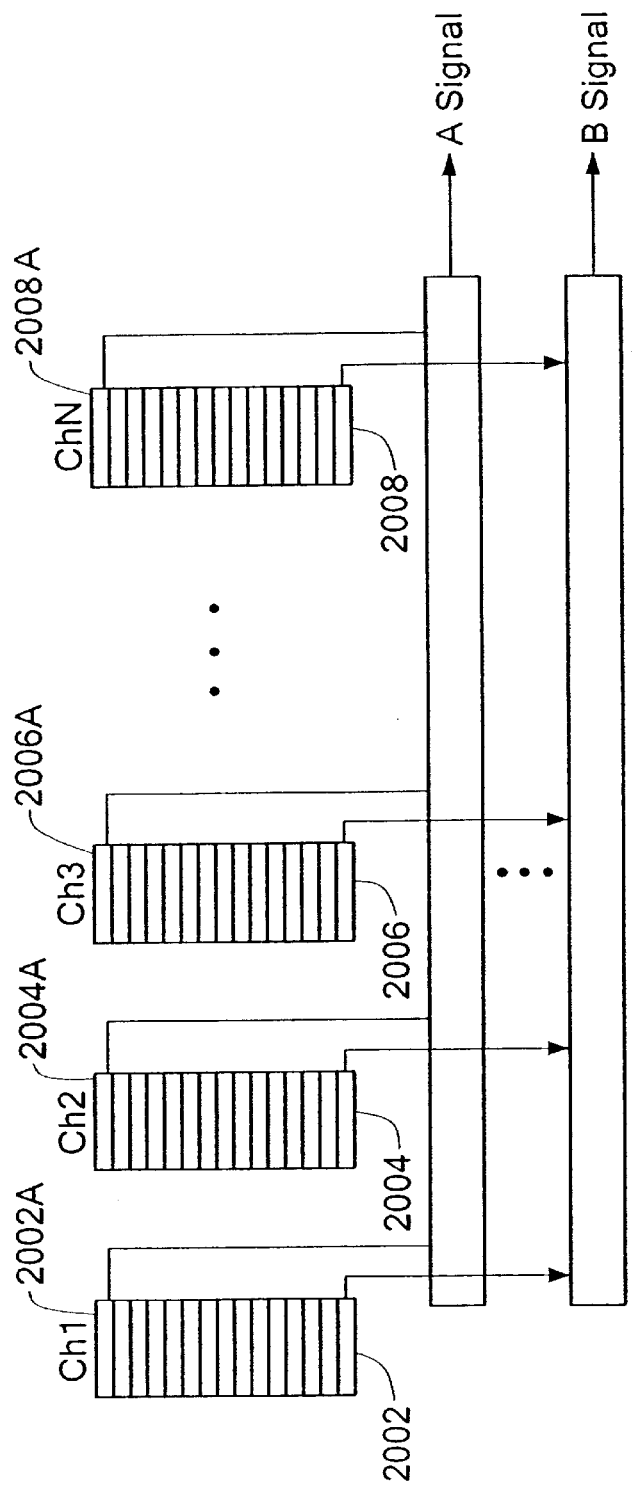

In a variation of the previous improvement depicted in FIG. 20A, simultaneous scans in all the beam angles can be implemented by high-speed digital processing. In particular, a single A/D converter can be multiplexed to each of the preamplifiers so that all signals are continuously digitized values 2002, 2004, 2006, and 2008. Alternatively, separate A/D converters can be used to continuously digitize the preamp output signals resulting in the same digitized values, i.e., 2002–2008. Each digitized signal can be delayed by simply selecting the digital value from a one of the continuously digitized values 2002–2008 for each channel. If the channel delays are evenly spaced across the array sequential values are taken from each set of values, e.g. value 2002A corresponding to set of values 2002; value 2004A corresponding to set of values 2004; value 2006A corresponding to set of values 2006; and value 2008A corresponding to set of values 2008. The combined output signal of the combination of plane wave A and B corresponds to a plane wave coming at an angle, as shown in FIG. 20B, wherein each of the two plane waves A and B are the result from the particular selection of the corresponding channel digitized values. The effective scan rate is determined by the speed that the processor can generate the appropriate sum signal and calculate its magnitude. Note that the delay module 1903 does not contain a physical delay line. Rather, the delay is implemented by a taking digitized sample from the plurality of A/D converted signals.

Exit signs could also contain coded Beacons to transmit evacuation instructions to evacuees with Trackers. For example, in conjunction with a temperature sensor or smoke detector on the other side of the exit door, evacuees could be warned not to open the door and instead be advised of a safer alternative exit. The advantage of ultrasound over RF communications is that the ultrasonic signal is more localized to the particular exit location and can transmit only into the adjacent rooms or halls. RF communications, on the other hand, can penetrate walls and might provide information to people who could not access that particular exit. For example, an RF transmitter could send signals to the floors above and below, where an exit may not be located.

Another embodiment of the Tracker is to use an omnidirectional receiver built into a highly portable "probe" which could be lowered into sections of a collapsed structure to search for a Beacon. In this case, a wire, cable, or other suitable link would send any received signal back to the operator, who would be holding a portable display system to view, or hear signals proportional to, the received signal strength.

Another embodiment useful in finding Beacons in a collapsed structure is to have the Beacon periodically switch to a lower frequency within the hearing range of search dogs, thus enabling dogs appropriately trained to supplement their sense of smell with an audible (to them) stimulus.

Figure 21:
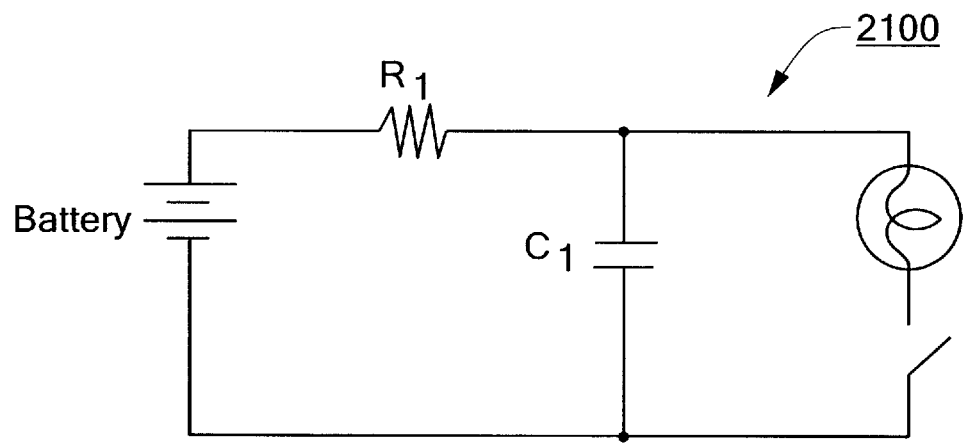
FIG. 21 is the electronic schematic of a pulsing heat source for use in a Beacon.

A Beacon could be comprised of, or be modified to include, a pulsing heat source, in order to present a pulsing target for thermal imaging cameras. In order to make the source respond at a fast enough flash rate, it would be necessary to design the source to have a fast thermal time constant. One way to accomplish this would be to thermally isolate a small resistive element. An alternative would be to use a small light bulb and to pulse the bulb (or other device containing a filament) at currents considerably higher than the normal operating current for a very short time period, and then to turn off the current to allow the bulb temperature to decay back to a lower level. By using a short pulse with a low duty cycle, the average current in the bulb can be kept sufficiently low to prevent excessive drain from the battery. The circuit 2100 of FIG. 21 provides the pulse driver with a high current in the bulb without causing high peak currents in the battery. The capacitor C1 provides local energy storage for the peak current.

A Tracker could be integrated with a thermal imaging camera (TIC) to provide the firefighter a more-complete assessment of the scene. The TIC provides a picture of the temperature of all objects within its view. Small temperature differences are detected and appear as changes in the gray-scale levels of the image. The TIC operates on a line-of-sight principle: only those objects in the direct view of the camera are displayed. Consequently, a TIC is unable to find a downed firefighter who is behind a desk, chair or sofa. Similarly, a TIC is unable to determine if a firefighter is just out of sight through a door. In contrast, the Tracker of this invention detects the Beacon's ultrasonic signals, which may be reflected off of walls and other objects in the same manner as audible sound waves. The Tracker will sense the presence of a hidden firefighter due to the reflection of the ultrasonic signals, albeit attenuated, off of the walls or objects. Thus, by having a small indicator, such as a bar graph, light, or meter, displayed on the TIC display, or by using a separate Tracker physically attached to the side of the display, and/or by means of an audible signal, the TIC operator could be made aware of firefighters who are nearby but out of sight. Such a feature would significantly extend the capabilities of the TIC and would improve the ability of the rescuing firefighter to locate the fallen comrade.

Figure 22:
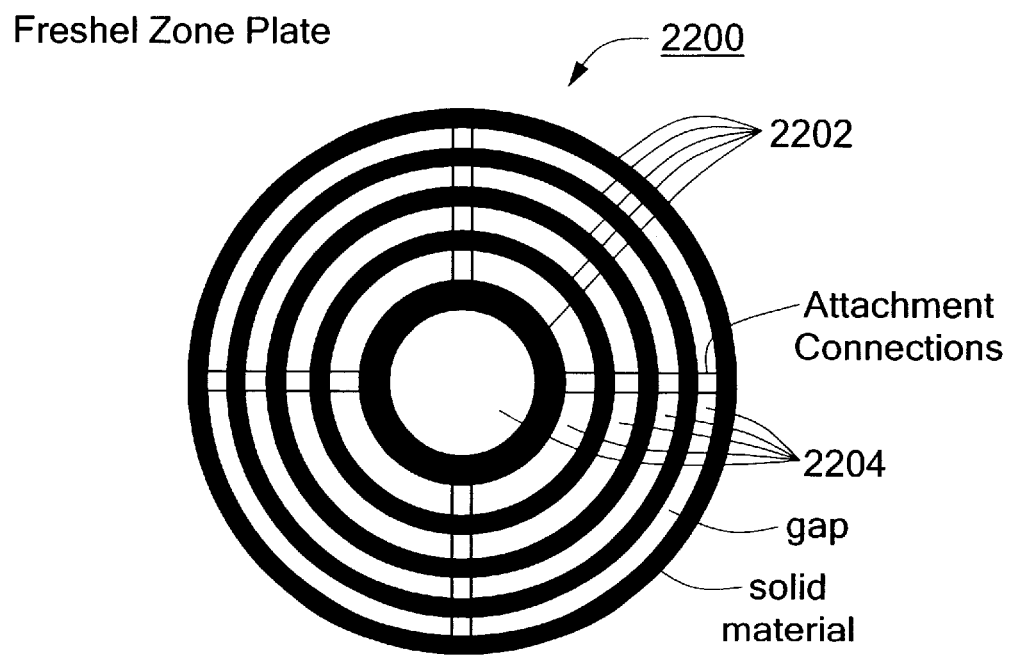
FIG. 22 depicts an example of a Fresnel zone plate, which is used in the imaging system of FIG. 23.
Figure 23:
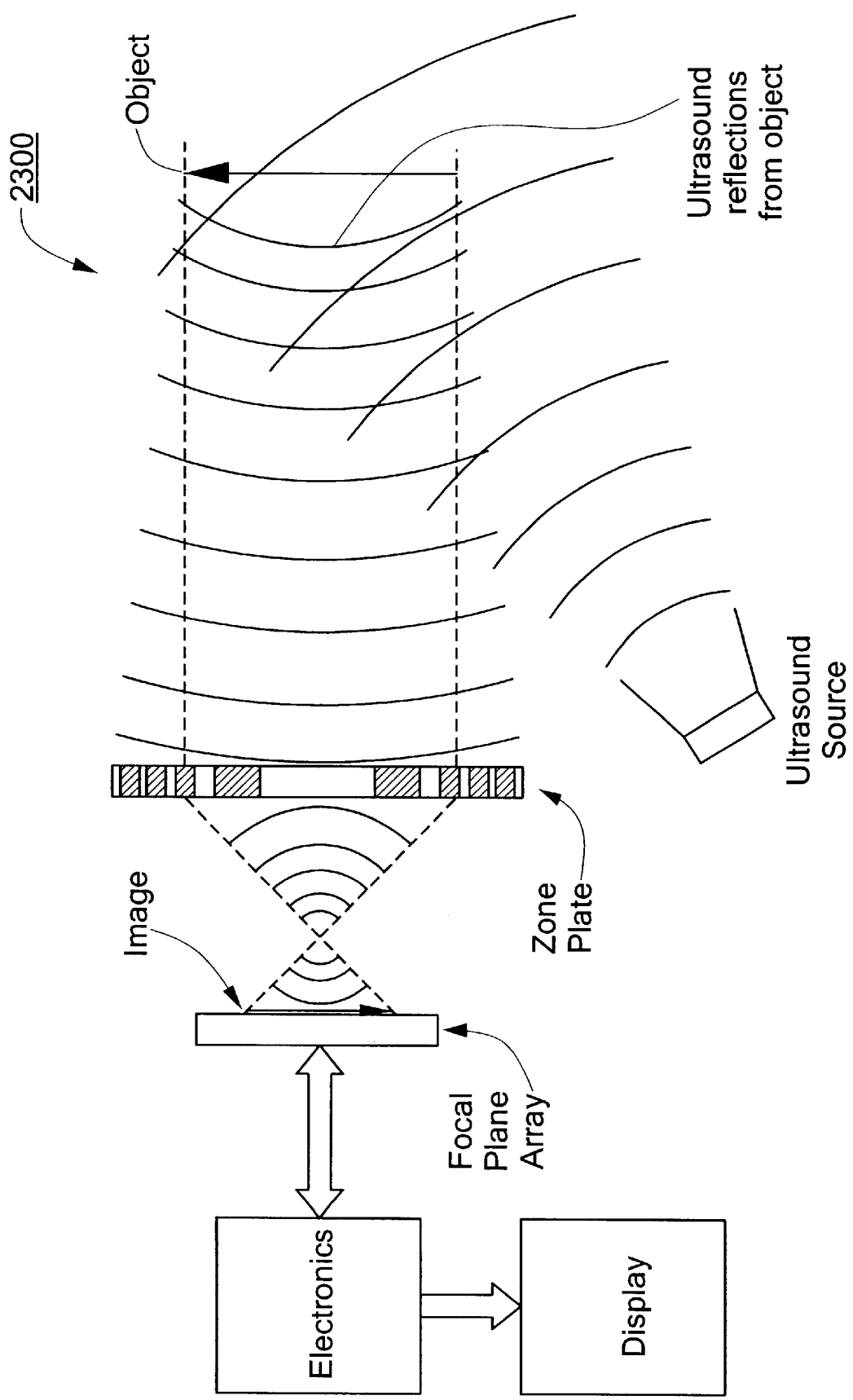
FIG. 23 is the block diagram of an ultrasonic imaging system using an array transducer and the Fresnel zone plate of FIG. 22.

Conventional optical systems such as a film-based camera, a digital camera, and a person's eye, all use a lens to form a real image on a focal-plane surface (the film, an array of photo sensors, or the person's retina). The source of light for the system could be the sun, a light bulb or a flash unit. When the system uses a lens to form the image, the system is termed refractive. Alternatively, a mirror could be used instead of the lens, as is done in larger telescopes, and the system is termed reflective. In principle, an ultrasonic imaging system that operates in air can be constructed in much the same manner as an optical imaging system. Ultrasound sources can be easily made. Arrays of sensors can also be easily made. However, there are no readily-available materials that have the desired acoustic properties for fabricating an air lens due to the tremendous mismatch in acoustic impedance between air (400 kg/m$^2$s) and plastics (3,000,000 kg/m$^2$s) or metals (40,000,000 kg/m$^2$s). The mismatch would cause most of the acoustic energy to be reflected off of the front surface of the lens. Most of the small amount of energy that actually went into the lens would remain and reverberate within the lens. For example, a loss of approximately 45 dB can occur at each surface of a metal lens and approximately 35 dB at each surface of a plastic lens. Thus a lens would cause signal reduction on the order of 70–90 dB, which would be intolerable for an imaging system. Even with matching layers, a lens will still suffer from excessive signal loss. On the other hand, a reflective approach could be used, but such a system would suffer from several problems. First, if the focal plane array were located on the axis of the reflector, the array would block the center of the reflector, and to be useful, the reflector size would have to be made considerably larger than the array. Second, if the array were located off the reflector axis, there would be a significant amount of distortion in the image. A solution, which allows a lens-like structure to be of size comparable to the array, is to use a Fresnel zone plate 2200, as shown in FIG. 22. The zone plate is formed by alternating rings of solid material 2202 (plastic, metal, etc.) and air gaps 2204. In order to hold the structure together, small connections can be added; these connections, particularly if considerably smaller than a wavelength, do not appreciably alter the performance of the plate. The zone plate 2200 would not provide a continuous lens function, as would an ideal lens, but would rather approximate the continuous function by a binary function. The alternating layers either pass or reflect the ultrasonic waves. An ultrasonic imaging system 2300 is shown in FIG. 23. Ultrasound signals from the ultrasound source 2301 are reflected off of an object 2302 and are focused by the Fresnel zone plate 2303 onto a focal plane array 2305 to form a real "image" 2304 thereon. The signals from the focal plane array 2305 are detected by the electronics 2306 and the image is displayed on display 2307. The imaging system of FIG. 23 can be fabricated such that the size of the zone plate 2303 is comparable to that of the focal plane array 2305. Thus compact, hand-held system imaging system can be built.

The ultrasound source shown in FIG. 23 can be continuous, similar to light bulbs in optical imaging systems, or can be pulsed. If the source is pulsed, then the ultrasonic "image" that is focused on the focal plane array will arrive at a fixed time after the pulse depending on the distance between the camera and the object. Depending on the complexity of the electronics, the camera could be designed to look at only objects within a specific distance from the camera by time gating the received signal at a fixed time relative to the transmitted pulse.

One application of the ultrasonic imaging system described above is searching for weapons that are concealed beneath clothing. Metallic weapons can be located by metal detectors. However, metal detectors cannot sense ceramic or plastic weapons. On the other hand, ultrasound signals are capable of penetrating normal clothing and will be reflected off plastics, ceramics, and metals. Thus, an imaging system as described above would be useful for such applications as screening passengers for aircraft and visitors in security-sensitive situations.

Another application of the ultrasonic imaging system described above is locating fire victims in dense smoke conditions. Due to the relatively long wavelength of ultrasound compared to optical waves, ultrasonic signals can pass through fog and smoke with virtually no scattering. Consequently, an imaging system constructed as above would be able to provide low-resolution images (compared to optical imaging systems) which would be sufficient for locating people and obstacles in a smoke-filled environment. Furthermore, there would be no "white-out" back-scattering effect as happens when a flashlight shines into smoke or fog.

Another embodiment of the ultrasonic imaging system that is particularly useful for scanning people in order to detect concealed weapons made of metallic, ceramic, plastic, or other hard materials, consists of overlaying the reflected ultrasound signals from the focused sensor array, or from mechanical scanning, onto a TV image from a camera similarly aimed. Thus, the screen will display the individual being scanned with the resolution and image quality of conventional video and any ultrasonic reflections from the hard materials of the concealed weapon will result in a visual indication as to the location of those weapons on that person. The visual indicator of the reflected ultrasonic image signal that is superimposed upon the video could be either the outline of the detected weapon (if the resolution of the ultrasonic imaging system is sufficient), or merely a dot, an "X", crosshairs, or an alphanumeric character, with any of those in a specified color and/or blinking. The advantage of this composite video/ultrasonic reflection display is enhanced resolution for observing the area and less demand upon the resolution required of the-ultrasonic scanner.

The technique of overlaying the output of an ultrasonic imaging system can also be utilized with Thermal Imaging Cameras to enhance TIC performance as well. For example, in fire scene applications, where TICs may have difficulty discerning images in the presence of a nearby overwhelming source of heat, the ultrasonic image would enhance the clarity of the screen. Further, any persons wearing Beacons, or nearby hazardous materials with identifying (coded) Beacons, as previously disclosed, would be immediately locatable on the TIC display. Furthermore, the distance (range) information extractable from the transmission and refection time of the ultrasound, could also be displayed.

The technology incorporated in Thermal Imaging Cameras can also be useful in detecting for concealed weapons because of the different temperature and thermal time constant between various weapon materials and human flesh. Thus, the thermal "outline" of these other materials, albeit beneath the clothing, would be discernable from the human body being scanned. The resolution of the system could be improved a number of ways. First, by optimizing the temperature range of the thermal sensors and the associated amplifiers and other signal processing circuitry to cover just the temperature range and output signal levels of interest. For example, from just below room temperature to a little above human temperature. Further improvement in the ability to detect these (concealed weapon) materials can be obtained by "pulsing" the person being scanned with a short burst of heat or other signal that will result in the rise in temperature of the various surfaces in the target field. The different time constants will absorb different amounts of the heat during the duration of the "blast" and will decay at different rates, thus producing different thermal images. This approach may be supplemented with the "overlay" (ultrasound and/or video) technique described above.

Independent ultrasonic imaging systems and/or those integrated with video and/or TIC systems for detecting concealed weapons can be further improved by displaying only the ultrasonic reflections from the concealed weapons and eliminating the reflections from the person's body or any object behind the person. This can be accomplished by filtering on the basis of amplitude of the reflected signal (i.e. the reflections off of the hard surface of a concealed weapon should be of significantly greater magnitude than those off of skin) and utilizing automatic gain control techniques, either analog or digital, and ignoring all signals below some appropriate, adjustable threshold. In addition, inasmuch as the ultrasonic imaging system can also determine distance by measuring the time for the ultrasonic signal to travel to, reflect, and return to the receiving array, all signals that took longer than those reflected from the person, could be ignored. This would remove the "clutter" that these other reflections, of no interest to the viewer, would otherwise produce on the display. Further, by synchronizing the ultrasonic/video/TIC scans, the ultrasonic distance ranging information of the person being scanned could be used in the system in which it is integrated to "blank" the display when focused on other than the person. This would aid in enabling the operator to concentrate only upon the person of interest.

Those of ordinary skill in the art should further appreciate that variations to and modification of the above-described methods and apparatus for a tracking, navigation, and safety system may be made without departing from the inventive concepts disclosed herein. Accordingly, the invention should be viewed as limited solely by the scope and spirit of the appended claims.

What is claimed is:

1. An apparatus for locating people and objects in a difficult to see environment, the apparatus comprises:

a beacon including an ultrasonic transmitter coupled to an omnidirectional antenna, the ultrasonic transmitter providing an ultrasonic signal having a first frequency to the omnidirectional antenna for transmission therefrom;

a horn structure having a neck with a first width and an exit orifice having a second width, the second width being greater than the first width a tracker including an ultrasonic receiver including an ultrasonic transducer, the ultrasonic transducer disposed within the neck of the horn structure, the ultrasonic receiver capable of receiving the ultrasonic signal having a first frequency via the horn structure, the tracker further providing an indicia of a measurement of the received signal strength of the received ultrasonic signal, wherein the indicia is selected from the group consisting of a single visual indicator in which the intensity of the single visual indicator is dependent upon the received signal strength, a single visual indicator pulsed on and off at a pulse rate in which the pulse rate of the single visual indicator is dependent upon the received signal strength, an audio signal in which the pitch changes as a function of the received signal strength and an audio signal pulsed on and off at a pulse rate in which the pulse rate is a function of the received signal strength;

wherein the approximate azimuth is provided by the direction corresponding to the maximum received signal strength and distance from the tracker to the beacon can be estimated as a function of the maximum received signal strength.

2. The apparatus of claim 1 further including a motion detector coupled to the beacon wherein the motion detector is configured and arranged to activate the beacon in the event that the beacon is motionless for a predetermined period of time.

3. The apparatus of claim 1 further including a pulse modulator coupled to the ultrasonic transmitter, wherein the pulse modulator is configured and arranged to cooperated with the ultrasonic transmitter to provide a pulsed ultrasonic signal for transmission via the omnidirection antenna.

4. The apparatus of claim 3 wherein the pulse modulator modulates the ultrasonic signal with an encoded unique identifier.

5. The apparatus of claim 4 wherein the unique identifier identifies an individual.

6. The apparatus of claim 4 wherein the unique identifier identifies an object.

7. The apparatus of claim 4 wherein the unique identifier identifies an exit.

8. The apparatus of claim 4 wherein the unique identifier is encoded using a sequence of digital bits.

9. The apparatus of claim 8 wherein the sequence of digital bits is encoded using a pulse position modulation scheme.

10. The apparatus of claim 8 wherein the sequence of digital its is encoded using a pulse width modulation scheme.

11. The apparatus of claim 3 further including an environmental sensor for measuring one or more environmental conditions coupled to the pulse modulator, wherein the pulse modulator provides an pulsed ultrasonic signal encoded with indicia of the measured one or more environmental conditions.

12. The apparatus for locating people and objects in a difficult to see environment, the apparatus comprising:
    a beacon including an ultrasonic transmitter coupled to an omnidirectional antenna, the ultrasonic transmitter providing an ultrasonic signal having a first frequency to the omnidirectional antenna for transmission therefrom;
    a tracker including an ultrasonic receiver having an ultrasonic transducer coupled to a directional antenna, the ultrasonic receiver including a narrow band receiver including an in-phase and a quadrature phase receiver, the in-phase and quadrature phase receivers each including a mixer coupled to the ultrasonic transducer and receiving signals therefrom and to a local oscillator, the mixer providing an output signal to a low pass filter, wherein the in-phase local oscillator and the quadrature-phase local oscillator are ninety degrees out of phase with one another, the narrow band receiver capable of receiving the ultrasonic signal having a first frequency via the directional antenna, the narrow band receiver further providing an output that is the in-phase received signal and the quadrature-phase received signal, and/or a combination of the in-phase and quadrature-phase signals and to provide an indicia of a measurement of the received signal strength of the in-phase received signal and the quadrature-phase received signal, and/or a combination of the in-phase and quadrature-phase signals, wherein the indicia is selected from the group consisting of a single visual indicator in which the intensity of the single visual indicator is dependent upon the received signal strength, a single visual indicator pulsed on and off at a pulse rate in which the pulse rate of the single visual indicator is dependent upon the received signal strength, an audio signal in which the pitch changes as a function of the received signal strength and an audio signal pulsed on and off at a pulse rate in which the pulse rate is a function of the received signal strength;
    wherein the approximate azimuth is provided by the direction corresponding to the maximum received in-phase received signal and the quadrature-phase received signal, and/or a combination of the in-phase and quadrature-phase signals strength and distance form the tracker to the beacon can be estimated as a function of the maximum received signal strength.

13. The apparatus of claim 12 further including a motion detector coupled to the beacon wherein the motion detector is configured and arranged to activate the beacon in the event that the beacon is motionless for a predetermined period of time.

14. The apparatus of claim 12 further including a pulse modulator coupled to the ultrasonic transmitter, wherein the pulse modulator is configured and arranged to cooperate with the ultrasonic transmitter to provide a pulsed ultrasonic signal for transmission via the omnidirectional antenna.

15. The apparatus of claim 14 wherein the pulse modulator modulates the ultrasonic signal with an encoded unique identifier.

16. The apparatus of claim 15 wherein the unique identifier identifies an individual.

17. The apparatus of claim 15 wherein the unique identifier identifies an object.

18. The apparatus of claim 15 wherein the unique identifier identifies an exit.

19. The apparatus of claim 15 wherein the unique identifier is encoded using a sequence of digital bits.

20. The apparatus of claim 19 wherein the sequence of digital bits is encoded using a pulse width modulation scheme.

21. The apparatus of claim 19 wherein the sequence of digital bits is encoded using a pulse width modulation scheme.

22. The apparatus of claim 12 further including an environmental sensor for measuring one or more environmental conditions coupled to the pulse modulator, wherein the pulse modulator provides an pulsed ultrasonic signal encoded with indicia of the measured one or more environmental conditions.

23. An apparatus for location people and objects in an difficult to see environment, the apparatus comprising:
    a beacon including an ultrasonic transmitter coupled to an omnidirectional antenna, the ultrasonic transmitter providing an ultrasonic signal having a first frequency to the omnidirectional antenna for transmission therefrom;
    a tracker including an ultrasonic receiver coupled to a directional antenna, the ultrasonic receiver including an adaptive AGC/squelch circuit that is operative to adjust the gain of received signals by reducing the gain of signals having a signal strength below a predetermined value, wherein the signals signal to noise ration of a signal having a signal strength greater than the predetermined value is increased, the ultrasonic receiver capable of receiving the ultrasonic signal having a first frequency via the directional antenna, the tracker further providing an indicia of a measurement of the received signal strength of the received ultrasonic signal, wherein the indicia is selected from the group consisting of a single visual indicator in which the intensity of the single visual indicator is dependent upon the received signal strength, a single visual indicator pulsed on and off at a pulse rate in which the pulse rate of the single visual indicator is dependent upon the received signal strength, an audio signal in which the pitch changes as a function of the received signal strength and an audio signal pulsed on and off at a pulse rate in which the pulse rate is a function of the received signal strength;

wherein the approximate azimuth is provided by the direction corresponding to the maximum received signal strength and distance from the tracker to the beacon can be estimated as a function of the maximum received signal strength.

24. The apparatus of claim 23 further including a motion detector coupled to the beacon wherein the motion detector is configured and arranged to activate the beacon in the event that the beacon is motionless for a predetermined period of time.

25. The apparatus of claim 23 further including a pulse modulator coupled to the ultrasonic transmitter, wherein the pulse modulator is configured and arranged to cooperate with the ultrasonic transmitter to provide a pulsed ultrasonic signal for transmission via the omnidirectional antenna.

26. The apparatus of claim 25 wherein the pulse modulator modulates the ultrasonic signal with an encoded unique identifier.

27. The apparatus of claim 26 wherein the unique identifier identifies an individual.

28. The apparatus of claim 26 wherein the unique identifier identifies an object.

29. The apparatus of claim 26 wherein the unique identifier identifies an exit.

30. The apparatus of claim 26 wherein the unique identifier is encoded using a sequence of digital bits.

31. The apparatus of claim 30 wherein the sequence of digital bits is encoded using a pulse position modulation scheme.

32. The apparatus of claim 30 wherein the sequence of digital bits is encoded using a pulse width modulation scheme.

33. The apparatus of claim 25 further including an environmental sensor for measuring one of more environmental conditions coupled to the pulse modulator, wherein the pulse modulator provides an pulsed ultrasonic signal encoded with indicia of the measured one or more environmental conditions.

34. An apparatus for location people and objects in a difficult to see environment, the apparatus comprising:

a beacon including a plurality of ultrasonic transmitters each coupled to a unique directional antenna to transmit a corresponding ultrasonic signal therefrom, wherein each directional antenna oriented to a distinct direction and providing a predetermined amount of overlap with the adjacent directional antennas, wherein the plurality of ultrasonic signals are directed such that a the ultrasonic signals are provided over a predetermined area, wherein each of the ultrasonic transmitters providing an ultrasonic signal having a first frequent to the corresponding directional antenna for transmission therefrom each of the ultrasonic transmitter including a pulse modulator coupled thereto, wherein each of the pulse modulators is configured and arranged to cooperate with the corresponding ultrasonic transmitter to provide a pulsed ultrasonic signal for transmission via the corresponding directional antenna, and wherein the pulse modulator modulates the ultrasonic signal with an encoded unique identifier that identifies one from the group comprising of an object, an obstacle, and an exit.

35. An apparatus for locating people and objects in a difficult to see environment, the apparatus comprising:

a beacon including an ultrasonic transmitter coupled to a directional antenna at a first location, the ultrasonic transmitter providing an ultrasonic signal having a first frequency to the directional antenna for transmission therefrom, the ultrasonic transmitter including a pulse modulator coupled thereto, wherein the pulse modulators configured and arranged to cooperate with the ultrasonic transmitter to provide a pulsed ultrasonic signal for transmission via the directional antenna, wherein the pulse modulator modulates the ultrasonic signal with an encoded unique identifier that identifies the first location and type of one form the group comprising of an individual, an object, an obstacle, and an exit, wherein the ultrasonic transmitter and directional antenna are collocated at the location and are operative to scan the area adjacent to the location with the pulsed ultrasonic signal.

36. The apparatus of claim 35 wherein the ultrasonic transmitter is mechanically rotated to scan the area adjacent to the first location.

37. The apparatus of claim 35 wherein the ultrasonic transmitter is electronically rotated to scan the area adjacent to the first location.

38. The apparatus of claim 35 wherein the beacon includes a plurality of ultrasonic transducers coupled to the directional antenna to provide an ultrasonic signal therefrom, each ultrasonic transducer further coupled to a delay module, each of the delay modules are operative to provide a predetermined delay in the transmission of the pulsed ultrasonic signal from the corresponding transducer to provide a desired predetermined direction for the pulsed ultrasonic signal, wherein the predetermined delay for each of the delay modules can be adjusted to electronically scan the area adjacent to the first location.

39. The apparatus of claim 38 wherein the delay modules are delay lines.

40. The apparatus of claim 38 wherein each delay modules is operative to convert the corresponding transducer signal to a digital format at a predetermined time corresponding to the desired delay of that corresponding signal.

41. An apparatus for location people and objects in a difficult to see environment, the apparatus comprising:

a beacon including an ultrasonic transmitter coupled to an omnidirectional antenna, the ultrasonic transmitter providing an ultrasonic signal having a first frequency to the omnidirectional antenna for transmission therefrom;

a remote display unit;

a tracker prove including an ultrasonic receiver coupled to a directional antenna, the ultrasonic receiver capable of receiving the ultrasonic signal having a first frequency via the directional antenna, the tracker further coupled to the remote display unit and further providing a measurement of the received signal strength of the received ultrasonic signal to the remote display unity, wherein the remote display unit is operative to provide indicia of the received measurement of the received signal strength, wherein the indicia is selected form the group consisting of a single visual indicator in which the intensity of the single visual indicator is dependent upon the received signal strength, a single visual indicator pulsed on and off at a pulse rate in which the pulse rate of the single visual indicator is dependent upon the received signal strength, an audio signal in which the pitch changes as a function of the received signal strength and audio signal pulsed on and off and at a pulse rate in which the pulse rate is a function of the received signal strength;

wherein the approximate azimuth is provided by the direction corresponding to the maximum received signal strength and distance from the tracker to beacon can be estimated as a function of the maximum received signal strength.

42. An apparatus for location people and objects in a difficult to see environment, the apparatus comprising:

a beacon including an ultrasonic transmitter coupled to an omnidirectional antenna, the ultrasonic transmitter providing an ultrasonic signal having a first frequency to the omnidirectional antenna for transmission therefrom, the beacon further including a second signal source that is periodically pulsed on, wherein the second signal source is a second ultrasonic transmitter that is configured and operative to transmit a second ultrasonic signal at a second frequency, wherein the second frequency is within the hearing range of a dog.

43. An apparatus for location people and objects in a difficult to see environment, the apparatus comprising:

a beacon including an ultrasonic transmitter coupled to an omnidirectional antenna, the ultrasonic transmitter providing an ultrasonic signal having a first frequency to the omnidirectional antenna for transmission therefrom, the beacon further including a second signal source that is periodically pulsed on, wherein the second signal source is a thermal transmitter that is configured and operative to transmit a thermal signal.

44. The apparatus of claim 43 wherein the thermal transmitter is a thermally isolated resistive element.

45. The apparatus of claim 43 wherein the thermal transmitter is a light bulb.

46. An apparatus for location people and objects in an difficult to see environment, the apparatus comprising:

a beacon including an ultrasonic transmitter coupled to an omnidirectional antenna, the ultrasonic transmitter providing an ultrasonic signal having a first frequency to the omnidirectional antenna for transmission therefrom;

a tracker including an ultrasonic receiver coupled to a directional antenna, the ultrasonic receiver capable of receiving the ultrasonic signal having a first frequency via the directional antenna, the tracker further providing an indicia of a measurement of the received signal strength of the received ultrasonic signal, wherein the indicia is selected from the group consisting of a single visual indicator in which the intensity of the single visual indicator is dependent upon the received signal strength, a single visual indicator pulsed on and off at a pulse rate in which the pulse rate of the single visual indicator is dependent upon the received signal strength, an audio signal in which the pitch changes as an function of the received signal strength and an audio signal pulsed on and off at a pulse rate in which the pulse rate is a function of the received signal strength, wherein the approximate azimuth is provided by the direction corresponding to the maximum received signal strength and distance from the tracker to the beacon can be estimated as a function of the maximum received signal strength; and a thermal imaging camera coupled to the tracker and aligned therewith, the thermal imaging camera and tracker combination operative to provide a thermal image of an area in conjunction with the indica of the received signal strength of the received ultrasonic signal of substantially the same area.

47. An apparatus for location people an objects in a difficult to see environment, the apparatus comprising:

a beacon including an ultrasonic transmitter coupled to an directional antenna, the ultrasonic transmitter providing an ultrasonic signal having a first frequency to the directional antenna for transmission therefrom toward an object or person to be imaged;

an ultrasonic imaging system including a Fresnel zone plate acoustically coupled the object or person that is to be imaged, a focal plane array including a plurality of ultrasonic transducers acoustically coupled to the Fresnel zone plate and operative to convert received ultrasonic signals received from the Fresnel zone plate into electrical signals, imaging electronics electrically coupled to the focal plane array and operative convert the electrical signals into video signal, a display coupled to the imaging electronics and operative to display the video signals as an acoustic image.

48. The apparatus of claim 47 further including a video imaging camera providing an optical video image of the person or object to be imaged, wherein display is operative to display the optical video image and overlay thereon the acoustic image formed by the ultrasonic imaging system.

49. The apparatus of claim 48 wherein the video imaging camera is a thermal imaging camera, the apparatus further including a thermal source coupled to the person or object to be imaged, wherein the person or object to be imaged is pulsed by a short pulse of thermal energy from the thermal source and wherein the display will provide an image of the increased absorption of the heat by the person or object to be imaged.

50. The apparatus of claim 49 wherein the received thermal and ultrasonic are amplitude filtered such that only thermal and ultrasonic signals having an amplitude greater than a predetermined value displayed.

* * * * *

UNITED STATES PATENT AND TRADEMARK OFFICE
CERTIFICATE OF CORRECTION

PATENT NO. : 6,826,117 B2
DATED : November 30, 2004
INVENTOR(S) : Wayne C. Haase et al.

It is certified that error appears in the above-identified patent and that said Letters Patent is hereby corrected as shown below:

Column 1,
Line 12, "SYSTEM" should read -- SYSTEM. --;

Column 19,
Line 13, "omnidirection" should read -- omnidirectional --;
Line 29, "its" should read -- bits --;

Column 20,
Line 48, "location" should read -- locating --;
Line 48, "an" should read -- a --;

Column 21,
Line 49, "location" should read -- locating --;
Line 60, "frequent" should read -- frequency --;

Column 22,
Lines 17 and 63, "form" should read -- from --;
Line 46, "location" should read -- locating --;
Line 54, "prove" should read -- probe --;

Column 23,
Line 4, "and audio" should read -- and an audio --;
Line 9, "to beacon" should read -- to the beacon --;
Lines 12, 24 and 38, "location" should read -- locating --;
Line 38, "an" should read -- a --;

UNITED STATES PATENT AND TRADEMARK OFFICE
CERTIFICATE OF CORRECTION

PATENT NO. : 6,826,117 B2
DATED : November 30, 2004
INVENTOR(S) : Wayne C. Haase et al.

It is certified that error appears in the above-identified patent and that said Letters Patent is hereby corrected as shown below:

Column 24,
Line 4, "an function" should read -- a function --; and
Line 18, "location people an objects" should read -- locating people and objects --.

Signed and Sealed this

Tenth Day of January, 2006

JON W. DUDAS
*Director of the United States Patent and Trademark Office*